United States Patent [19]

Yamane

[11] Patent Number: 5,799,542
[45] Date of Patent: Sep. 1, 1998

[54] BICYCLE SHIFT CONTROL DEVICE

[75] Inventor: Takuro Yamane, Shimonoseki, Japan

[73] Assignee: Shimano, Inc., Osaka, Japan

[21] Appl. No.: 706,649

[22] Filed: Sep. 4, 1996

[30] Foreign Application Priority Data

| Oct. 11, 1995 | [JP] | Japan | ................... | 7-262654 |
| Feb. 26, 1996 | [JP] | Japan | ................... | 8-037841 |
| Feb. 26, 1996 | [JP] | Japan | ................... | 8-037842 |
| Feb. 26, 1996 | [JP] | Japan | ................... | 8-037843 |

[51] Int. Cl.$^6$ .................. B62M 25/04; B62K 23/02
[52] U.S. Cl. .................. 74/489; 74/142; 74/475; 74/502.2
[58] Field of Search .................. 74/142, 489, 502.2, 74/475

[56] References Cited

U.S. PATENT DOCUMENTS 5,095,768  3/1992  Nagano ............................ 74/475

FOREIGN PATENT DOCUMENTS

| 0661205 A1 | 7/1995 | European Pat. Off. . |
| 3200562 A1 | 7/1983 | Germany . |
| 4138311 A1 | 5/1992 | Germany . |
| 2183796 | 6/1987 | United Kingdom . |

*Primary Examiner*—Allan D. Herrmann
*Attorney, Agent, or Firm*—James A. Deland

[57] ABSTRACT

A bicycle shift control device for controlling a gear shifter via a gear shift cable includes a winding member supported for rotation around an axis for winding the gear shift cable, a first control member for rotating the winding member in a first direction, and a second control member mounted concentrically with the axis. The winding member rotates in a second direction opposite the first direction in response to movement of the second control member in the direction of the axis.

40 Claims, 20 Drawing Sheets

5,799,542

BICYCLE SHIFT CONTROL DEVICE

BACKGROUND OF THE INVENTION

The present invention is directed to a bicycle shift control for controlling a gear shifter via a gear shift cable.

A conventional bicycle shift control device is disclosed in U.S. Pat. No. 5,095,768. With this device, upshifts and downshifts each are made with a swing-type control lever. More specifically, the displacement of a first control lever during upshifting is transmitted to the winder via a ratchet pawl that engages teeth formed on the outer peripheral surface of the winder. When downshifting, the displacement of a second control lever controls a ratchet pawl that engages teeth formed on the outer peripheral face of the winder to hold the position of the winder. Rotation of the second control lever causes the winder to rotate in the downshifting direction by shifting increments equal to 1 stage.

In either case, the ratchet mechanism used with the control levers usually incorporates ratchet teeth formed on the outer peripheral surface of the winder and a ratchet pawl on the outside of the winder which engages the ratchet teeth. Thus, the ratchet pawl protrudes from the side of the winder, and a housing must be used which covers the entire structure. As a result, the shifting device has a considerably large overall structure. If the ratchet teeth are formed on the inner peripheral surface of the winder with the ratchet pawl disposed inside the winder, the outer diameter of the winder becomes extremely large, so again the shifting device has a considerably large overall structure.

A one-way ratchet mechanism consisting of a ratchet pawl and ratchet teeth could be realized in an axially arranged structure which incorporates ratchet teeth formed on the side face of the winder and a ratchet pawl axially separated from the winder so as to engage the ratchet teeth. However, this results in a shift control device that is longer in the axial direction, which is inconvenient for bicycle shift controls.

Another shifting device is disclosed in GB 2,183,796. In this device, a first control lever that protrudes from the side of the shifting device is coupled to a ratchet pawl that engages teeth formed on the outer peripheral surface of a ring-shaped winder. During upshifting, the displacement of the control lever is transmitted to the winder via the ratchet pawl that engages the teeth formed on the outer peripheral surface of the winder.

Ratchet teeth that determine the shift position and notches that temporarily hold the position of the winder are formed at the outer edges of the two end faces of the winder. A second control mechanism is provided with upper and lower ratchets arranged so as to sandwich some of these ratchet teeth and notches. The second control mechanism operates by sliding in the direction of the rotational axis of the winder. More specifically, when a control button is pressed down, the upper ratchet provided on the second control mechanism is allowed to enter the notches, while the lower ratchet is removed from the ratchet used to determine the shift position. The action of a return spring causes the winder to rotate back until the upper ratchet hits a stopper wall of the notch. When the control button is released, the rising motion of the second control mechanism allows the lower ratchet to enter the ratchet teeth used to determine the shift position and allows the upper ratchet to pull out of the notches.

Because the ratchet mechanism for the first control lever is disposed at the outer peripheral surface of the winder, and since the first control lever protrudes from the side of the winder, the resulting shift control device has a considerably large overall structure. Similarly in the case of the second control mechanism, the upper and lower ratchets sandwich the winder from the outer peripheral edge, so the structure of the second control is also shaped in such a way as to protrude radially outwardly. The existence of two main parts protruding from the side of the winder is a problem not only in hindering the potential for making the shift control more compact, but also in terms of limiting the ways it can be attached in terms of design.

SUMMARY OF THE INVENTION

The present invention is directed to a bicycle shift control device which is axially and radially compact. In one embodiment of the present invention, a bicycle shift control device for controlling a gear shifter via a gear shift cable includes a winding member supported for rotation around an axis for winding the gear shift cable, a first control member for rotating the winding member in a first direction, and a second control member mounted concentrically with the axis. The winding member rotates in a second direction opposite the first direction in response to movement of the second control member in the direction of the axis. In a more specific embodiment, the first control member includes a boss that rotates about the axis and an elongated lever which extends from the boss in the direction of the axis. To make the device compact, the first control member forms a bottom face of the shift control device, and the second control member forms a top face of the shift control device.

In this embodiment, the first control member rotates between a first control member start position and a first control member end position. A clutch member rotates integrally with the first control member, wherein the clutch member moves in the direction of the axis from a first clutch position when the first control member is located in the first control member start position to a second clutch position as the first control member rotates toward the first control member end position. The clutch member is disengaged from the winding member when the clutch member is located in the first clutch position, and the clutch member is engaged with the winding member when the clutch member is located in the second clutch position. This forms a one-way transmission mechanism for winding the winding member in the upshifting direction.

The second control member moves linearly between a second control member start position and a second control member end position in the direction of the axis. The shifting device further includes a fixed member which does not rotate with the winding member and an idler member which rotates integrally with the winding member. The idler member moves in the direction of the axis from a first idler position when the second control member is located in the second control member start position to a second idler position as the second control member moves toward the second control member end position. The idler member engages the fixed member when the idler member is located in the first idler position, and the idler member is disengaged from the fixed member when the idler member is located in the second idler position. This allows the winding member to rotate in the unwinding direction as a result of the biasing force of a return spring when the second control member is moved to the second control member end position. An inclined guide mechanism prevents the winding member from rotating uncontrollably when the idler member and winding member are disengaged.

In an alternative embodiment of the present invention, an idler member is coupled to the second control member and is structured to move in the direction of the axis from a first idler position when the second control member is located in the second control member start position to a second idler position as the second control member moves toward the second control member end position. However, in this embodiment the idler member also is structured to rotate around the axis. An engagement mechanism engages the idler member with the winding member when the idler member is located in the first idler position and disengages the idler member from the winding member when the idler member is located in the second idler position. A cam mechanism causes the idler member to rotate around the axis as the idler member moves from the first idler position to the second idler position to ensure disengagement between the idler member and the winding member. A winding member support means prevents uncontrolled rotation of the winding member when the idler member is disengaged from the winding member. In this embodiment, the winding member support means comprises a plurality of winding member splines disposed on the winding member and a plurality of second control member splines disposed on the second control member. The winding member splines engage with the second control member splines when the idler member is disengaged from the winding member.

BRIEF DESCRIPTION OF THE DRAWINGS

FIGS. 15(a)–15(b) show an operating state of the shift control device shown in FIG. 14, wherein FIG. 15(a) is a partial cross sectional view of the shift control device and FIG. 15(b) is an expanded schematic view of the shift control device;

FIGS. 16(a)–16(b) show an operating state of the shift control device shown in FIG. 14, wherein FIG. 16(a) is a partial cross sectional view of the shift control device and FIG. 16(b) is an expanded schematic view of the shift control device;

FIGS. 17(a)–17(b) show an operating state of the shift control device shown in FIG. 14, wherein FIG. 17(a) is a partial cross sectional view of the shift control device and FIG. 17(b) is an expanded schematic view of the shift control device;

FIGS. 18(a)–18(b) show an operating state of the shift control device shown in FIG. 14, wherein FIG. 18(a) is a partial cross sectional view of the shift control device and FIG. 18(b) is an expanded schematic view of the shift control device;

FIGS. 19(a)–19(b) show an operating state of the shift control device shown in FIG. 14, wherein FIG. 19(a) is a partial cross sectional view of the shift control device and FIG. 19(b) is an expanded schematic view of the shift control device;

DETAILED DESCRIPTION OF THE EMBODIMENTS

Figure 1:
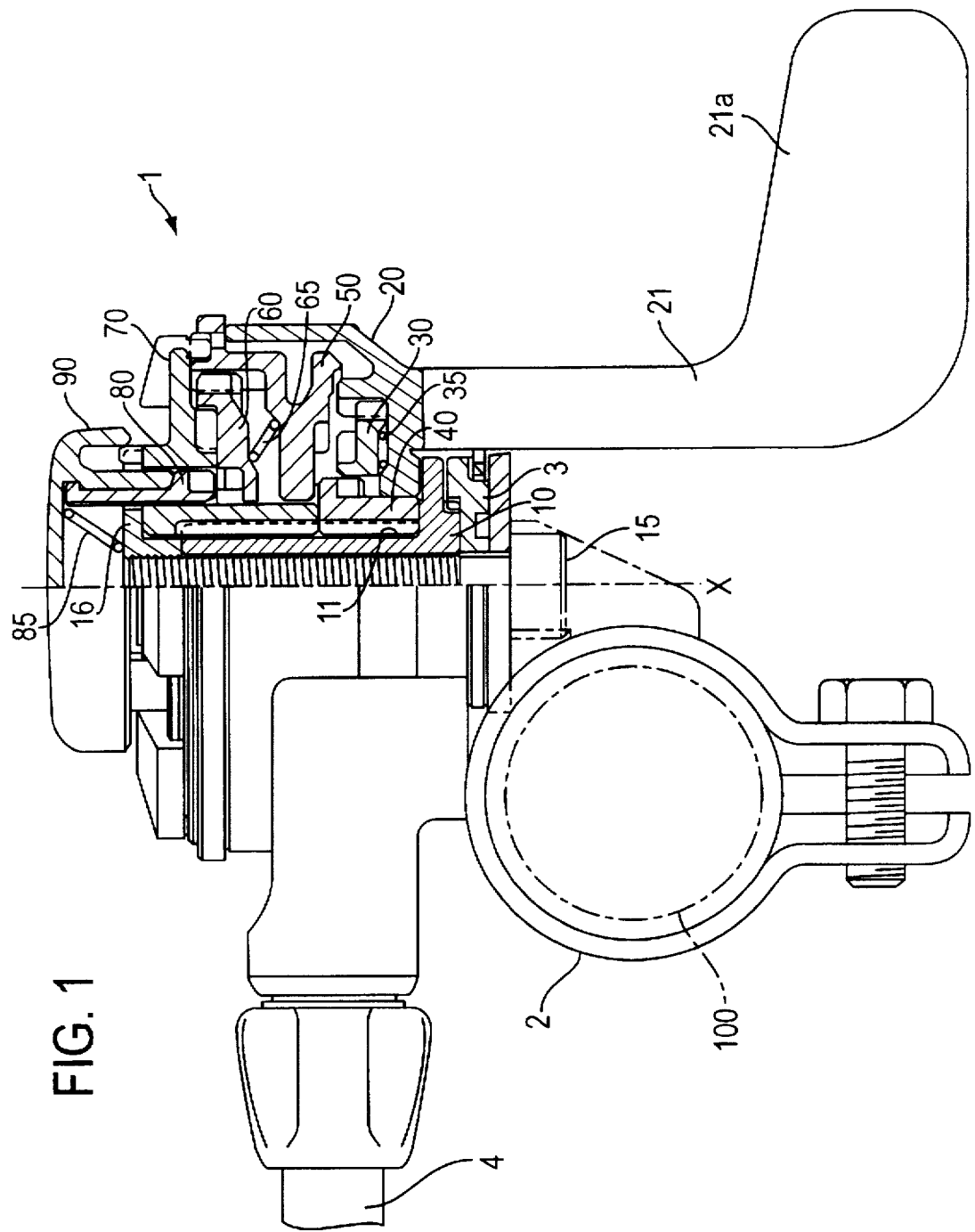
FIG. 1 is a partial cross sectional view of a particular embodiment of a bicycle shift control device according to the present invention.
Figure 2:
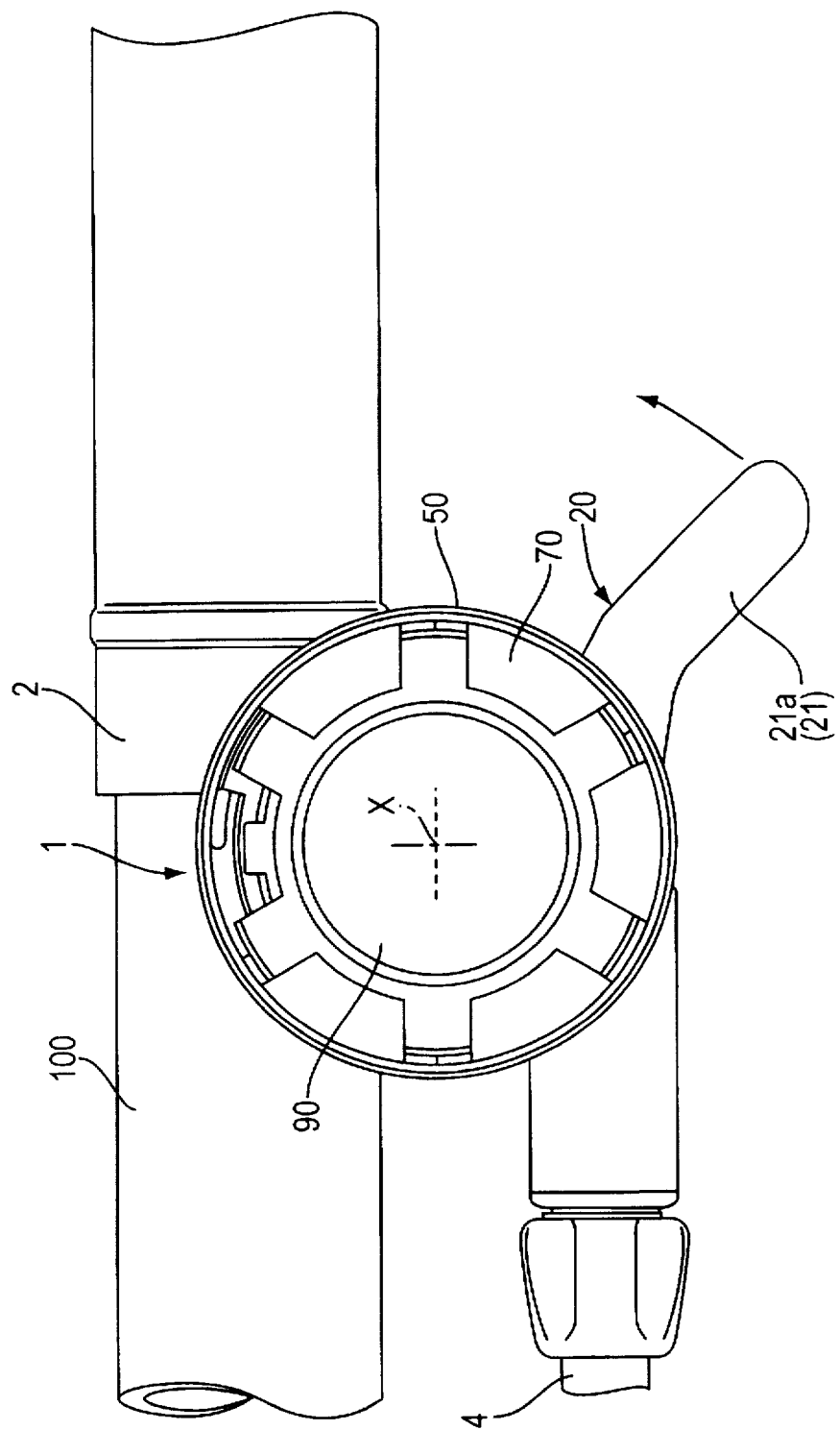
FIG. 2 is a top view of the shift control device shown in FIG. 1.
Figure 3:
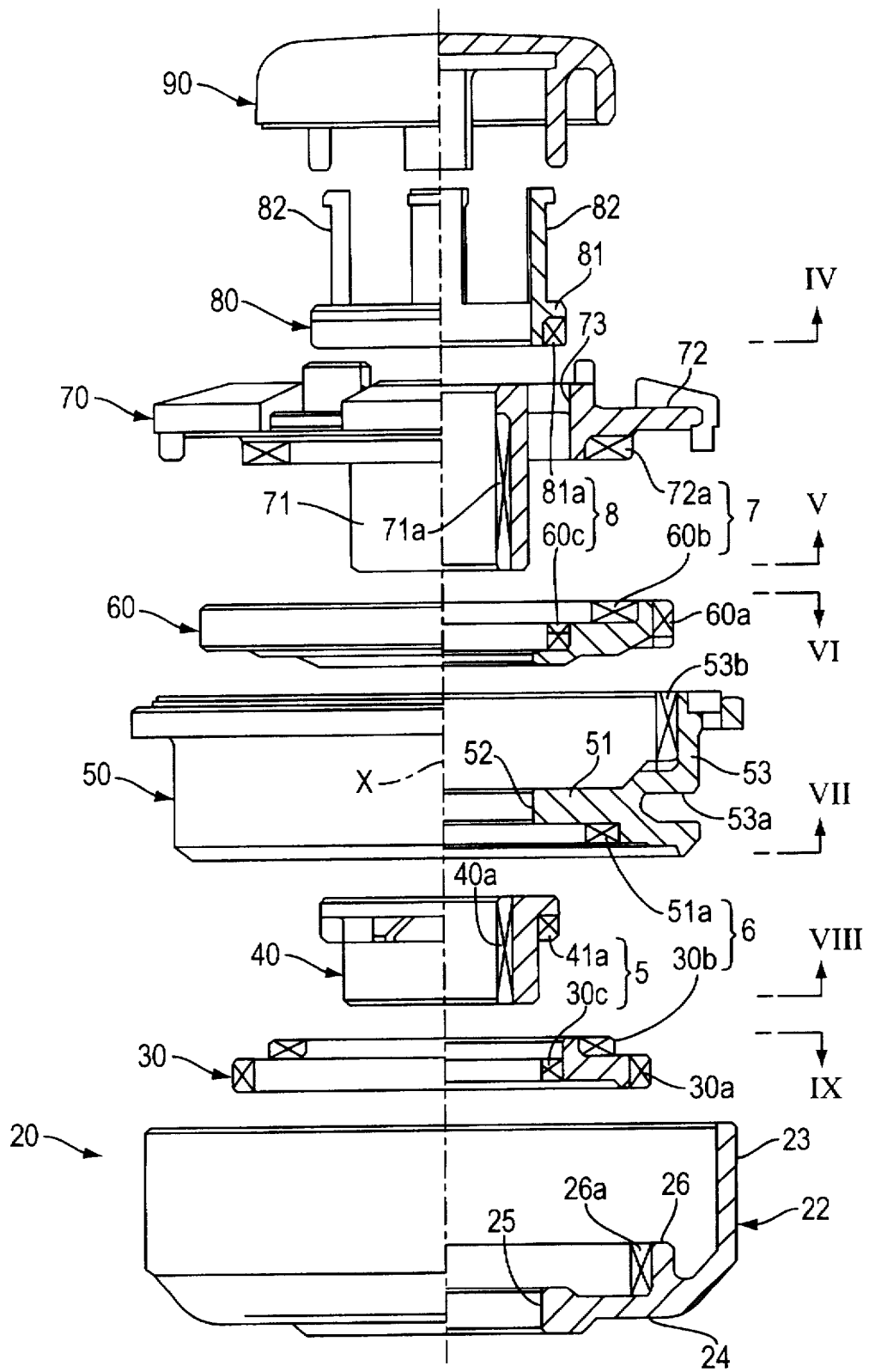
FIG. 3 is an exploded view of major components of the shift control device shown in FIG. 1.

FIG. 1 is a partial cross sectional view of a particular embodiment of a bicycle shift control device according to the present invention, FIG. 2 is a top view of the shift control device, and FIG. 3 is an exploded view of major components of the shift control device. As shown in those figures, the bicycle shift control 1 of the present invention is attached to a bicycle handlebar 100 using a band 2 and a bracket 3. The shift control 1 comprises a tube shaft 10 having an axis X, a first control 20 which is operated by swinging rotation, a clutch 30, a fixed guide 40 that is fixed to the tube shaft 10, a winder 50 for winding the gear shift cable 4, an idler 60, a base member 70, and a second control 80. The first control 20, clutch 30, fixed guide 40, winder 50, idler 60, base member 70, and second control 80 are all located concentrically with respect to the axis X. These parts can thus all be assembled by being inserted in the direction of the axis X relative to the tube shaft 10. The tube shaft 10 is fitted around a fixing bolt 15 inserted into a bracket 3 and is tightened by a nut 16. An outer spline 11 extending parallel to the axis X is formed around the tube shaft 10.

The first control 20 is constructed as a swinging lever type. It is equipped with a boss 22 and a lever 21 that is attached at a location spaced apart from the axis X. The boss 22 consists of an outer peripheral wall 23 and a floor 24 with a center hole 25. The outer peripheral wall 23 forms the greater proportion of the outer peripheral sidewall of the shift control 1. An annular protrusion 26 extending in the direction of the axis X is also provided in the floor 24, and an inner spline 26a extending parallel to the axis X is formed along the inner periphery of the annular protrusion 26. Lever 21 is attached to the floor 24 of the boss The shift control 1 is attached to the top of the handlebar 100 via the band 2 and bracket 3 such that the lever 21 extends from the top of the handlebar 100 to a location below the handlebar. A finger-contact part 21a is formed bending outwardly substantially perpendicular to the axis X at a place that is approximately the same level as the bottom of the handlebar. This facilitates operation by the thumb and the like of the cyclist's hand gripping the handlebar grips. As will be described in greater detail below, the second control 80 is in a location which is not that much higher than the upper face of the handlebar so as to similarly facilitate operation by the thumb of the cyclist's hand gripping the handlebar grip.

Figure 9:
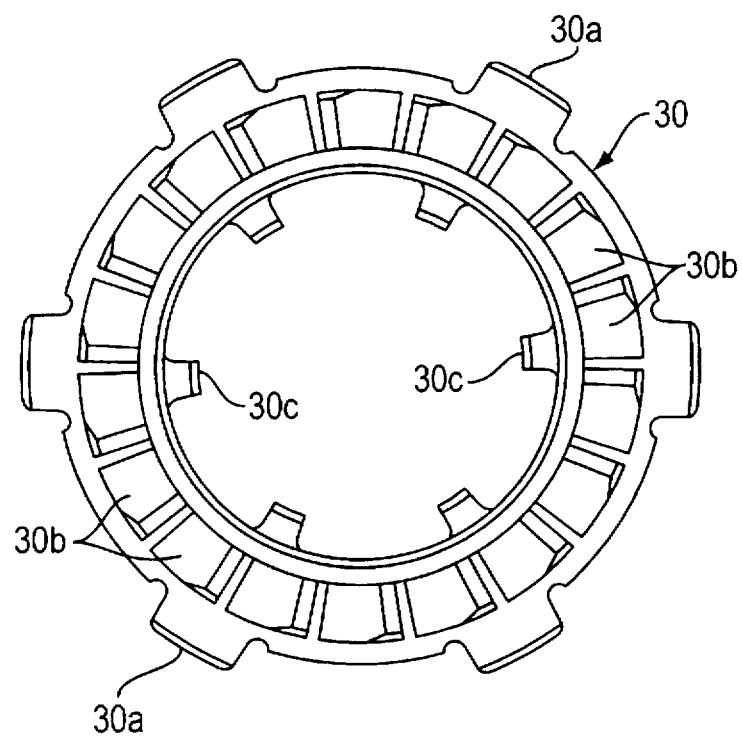
FIG. 9 is a view of the shift control device taken along line IX—IX in FIG. 3.

A ring-shaped clutch 30 is mounted on the floor 24 at the inner peripheral side of the annular protrusion 26. As shown in FIG. 9, an outer spline 30a is formed along the outer periphery of the clutch 30 so as to be engaged with the inner spline 26a of the annular protrusion 26. As a result, the clutch 30 rotates around the axis X integrally with the first control 20 and is slidable in the direction of the axis X relative to the first control 20. Eighteen engaging teeth 30b are distributed in the peripheral direction on the top face of the clutch 30, while six cam followers 30c formed as radially inwardly projecting protrusions with inclined faces in the peripheral direction are distributed along the inner periphery of clutch 30. A first spring 35 is inserted between the boss 22 of the first control 20 and the clutch 30 for biasing clutch 30 upward.

Figure 8:
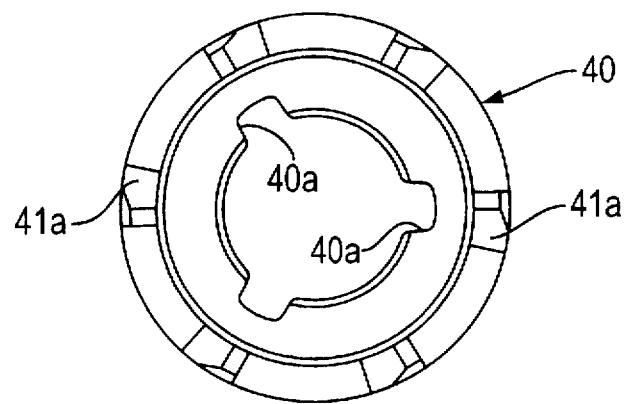
FIG. 8 is a view of the shift control device taken along line VIII—VIII in FIG. 3.

The bottom of the cylindrical fixed guide 40 is inserted between the tube shaft 10 and the center hole 25 per first control 20. An inner spline 40a is formed along the inner periphery of the fixed guide 40 so as to be engaged with the outer spline 11 of the tube shaft 10 so that the fixed guide 40 cannot rotate around the axis X. A collar 41 is provided in the top of the fixed guide 40. As shown in FIG. 8, six cams 41a with inclined faces in the peripheral direction are distributed in the peripheral direction on the bottom face of the collar 41. The clutch 30 is not separated from the floor 24 of the first control 20, despite the energizing force of the first spring, at the relative rotating positions of the clutch 30 and fixed guide 40 where the cam followers 30c and cams 41a face each other and come into contact at the tips of the inclined faces. However, at the relative rotating positions of the clutch 30 and fixed guide 40 where the cam followers 30c and cams 41a do not contact each other at the tips of the inclined faces, the clutch 30 is displaced by the energizing force of the first spring in the direction of the axis X and is separated from the floor 24 of the first control 20. In other words, the cam followers 30c and the cams 41a produce a cam mechanism 5 which displaces the clutch 30 between a first position where it is in contact with or near the floor 24 of the first control 20 and a second position where it is separated from the floor 24.

Figure 7:
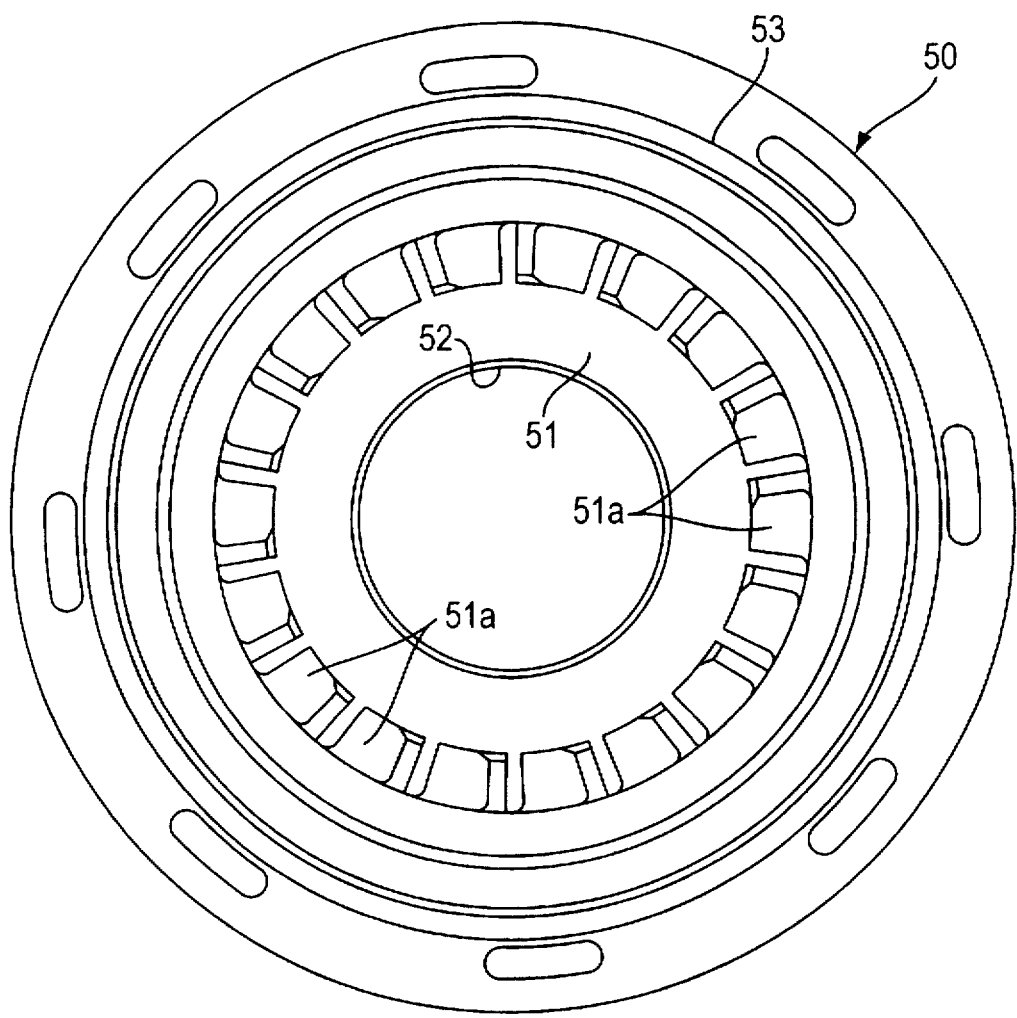
FIG. 7 is a view of the shift control device taken along line VII—VII in FIG. 3.

The winder 50 is pan-shaped with an outer peripheral wall 53 and a floor 51 with a center hole 52. As is apparent in FIG. 7, eighteen engagement teeth 51a capable of being engaged with the engaging teeth 30b of the clutch 30 are distributed in the peripheral direction on the bottom face of the floor 51. In other words, the engaging teeth 30b and engagement teeth 51a produce an engagement mechanism 6 by which they are disengaged when the clutch 30 is in the first position and are engaged when the clutch 30 is in the second position. A cable groove 53a for securing and winding the gear shift cable 4 is provided at the outer periphery of the outer peripheral wall 53 of the winder 50. An inner spline 53b extending in the direction of the axis X is formed at the inner periphery of the outer peripheral wall 53. As is apparent in FIG. 1, the clutch 30 is placed in an annular space formed by the winder 50, the fixed guide 40, and the boss 22 of the first control 20.

Figure 6:
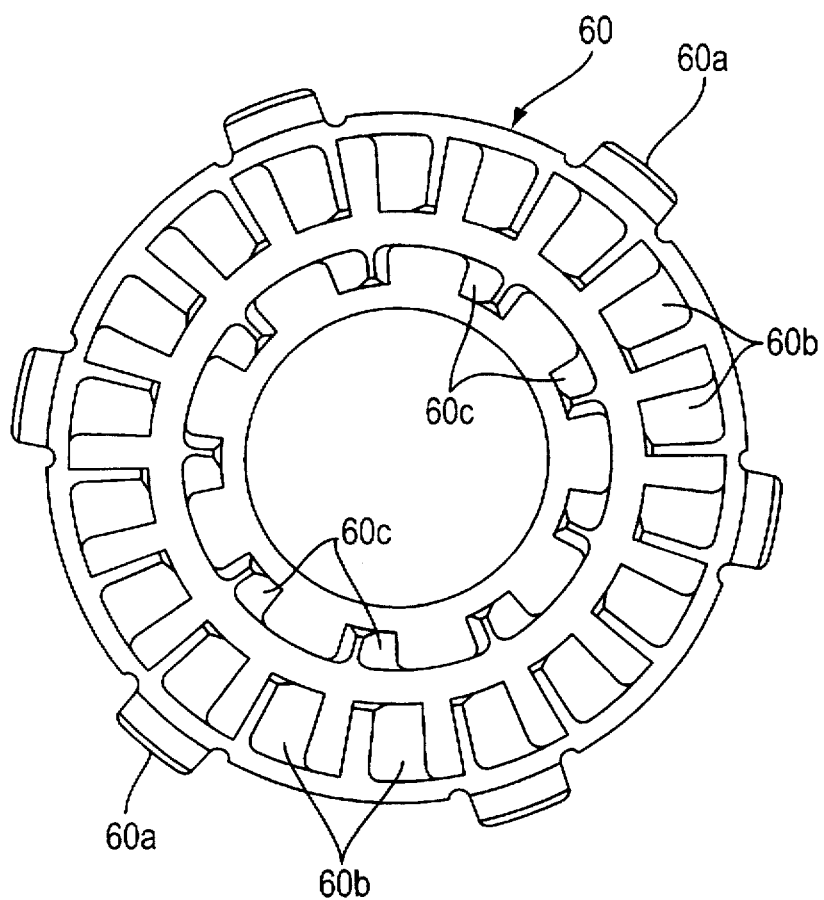
FIG. 6 is a view of the shift control device taken along line VI—VI in FIG. 3.

An outer spline 60a that engages with the inner spline 53b of the winder is formed at the outer periphery of the idler 60, which is ring-shaped. As a result, the idler 60 rotates around the axis X integrally with the winder 50 and is slidable in the direction of the axis X relative to the winder 50. As shown in FIG. 6, the inner periphery of the winder 50 is formed in two stages. Eighteen engaging teeth 60b are distributed in the peripheral direction on the inner peripheral face of the stage with the larger diameter, while 9 guided parts 60c with inclined faces are distributed in the peripheral direction along the inner peripheral face of the stage with the smaller diameter. A second spring 65 is inserted between the idler 60 and the floor 51 of the winder 50, thus biasing the idler 60 upward along the direction of the axis X.

Figure 5:
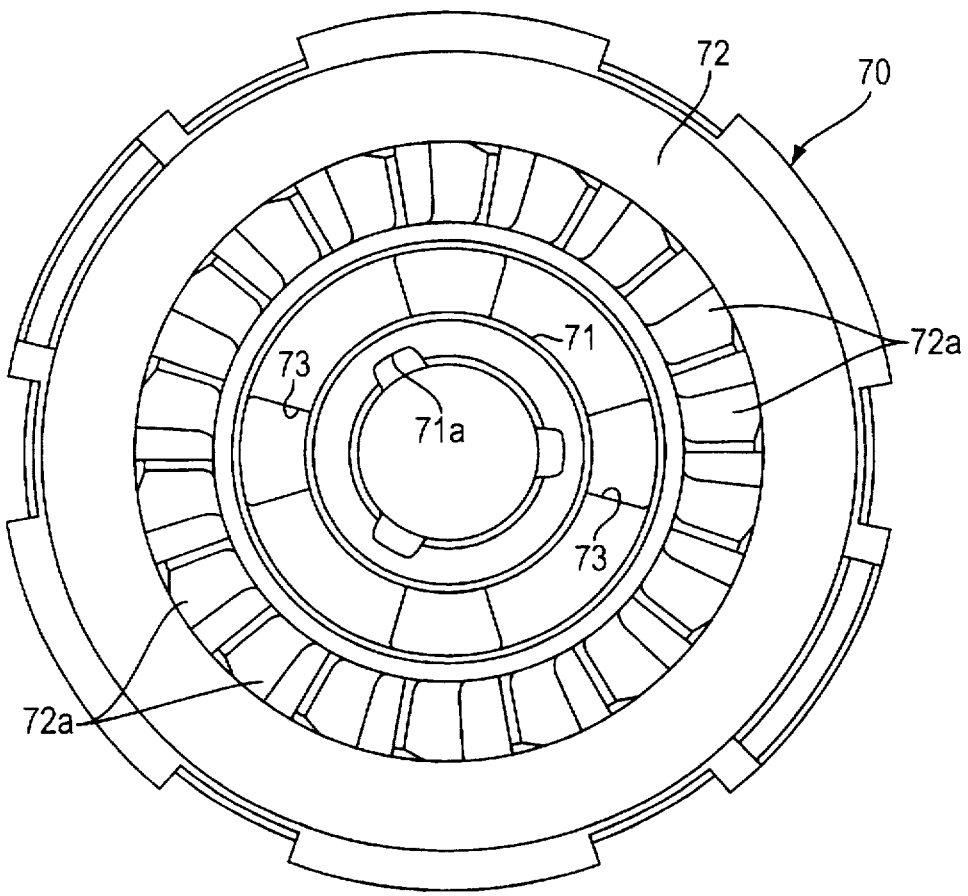
FIG. 5 is a view of the shift control device taken along line V—V in FIG. 3.

The base member 70 comprises a cylindrical part 71 and a disc part 72 extending radially outward from the cylindrical part 71. Four through holes 73 are distributed in the peripheral direction in the boundary between the disk part 72 and cylindrical part 71. As shown in FIG. 5, eighteen engagement teeth 72a which can engage with the engaging teeth 60b of the idler 60 are distributed in the peripheral direction on the bottom face of the disk part 72. Because the idler 60 is upwardly biased by the second spring 65, the engaging teeth 60b are usually engaged in the engagement teeth 72a. The upper face of the disk part 72 is formed in the shape of an arched roof, forming the upper outer shape of the shift control 1. An inner spline 71a extending in the direction of the axis X is formed in the inner periphery of the cylindrical part 71 so as to be engaged with the outer spline 11 of the tube shaft 10. The base member 70 is fixed to the tube shaft 10 by this engagement and by being tightened with the nut 16.

Figure 4:
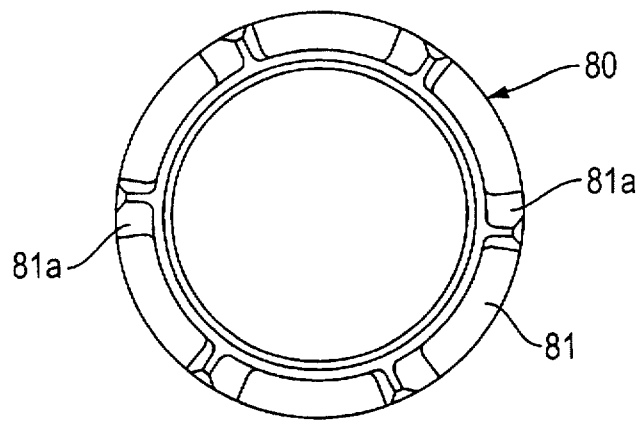
FIG. 4 is a view of the shift control device taken along line IV—IV in FIG. 3.

The second control 80, which operates by linear displacement in the direction of the axis X, comprises a ring 81 and four legs 82 extending from the top face of the ring 81 along the direction of the axis X. These legs 82 are inserted from the bottom face side into the through holes 73 of the base member 70, sliding reciprocally through the through holes 73. As shown in FIG. 4, six guides 81a with inclined faces capable of coming into contact with the inclined faces of the guided parts 60c of the idler 60 are distributed in the peripheral direction on the bottom face of the ring 81. When the second control 80 is pushed down so that the guided parts 60c of the idler 60 and the guides 81a of the second control 80 come into contact, the idler 60 pushes down against the second spring 65. This allows the engaged teeth 72a of the base member 70 and the engaging teeth 60b of the idler 60 to be disengaged. When the idler 60 and base member 70 are disengaged, the idler 60, which is linked to and rotates with the winder 50, is rotated by the tensile force of the control cable 4, while the engaging teeth 60b of the idler 60 are moved so as to be engaged with the subsequent engagement teeth 72a of the base member 70 by means of the second spring 65 and the inclined direction of the inclined faces of the guides 81a. In other words, the engaging teeth 60b of the idler 60 and the engagement teeth 72a of the base member 70 produce a holding engagement mechanism 7 by which the winder 50 is held in the prescribed rotating position. The guides 81a of the second control 80 and the guided parts 60c of the idler 60 produce an inclined guide mechanism 8 by which the engaging teeth 60b of the idler 60 are engaged with the subsequent engagement teeth 72a of the base member 70 in order to change the rotating position of the winder 50.

Because the second control 80 is operated by being pushed from above, a cap 90 is mounted on the tips of the legs 82. When the second control 80 is held in an upward position by the second spring 65, the top face of the cap 90 is at nearly the same level as the upper face of the disk part 72 of the base member 70. This cap 90 gives the second control 80 the appearance of an operating button. A third spring 85 is mounted between the cap 90 and the nut 16 for biasing the second control 80 toward the control starting point position (home position).

In this embodiment, the winder 50 is wound up by swinging the first control 20 from the control starting point to the control end point, and it is returned by sliding second control 80 linearly along the axis X from the control starting point to the control end point. The second control 80 is returned from the control end point to the control starting point by the third spring 85, and the first control 20 is returned from the control end point to the control starting point by a return spring not shown in the figures. The action during the shifting operations of the shift control 1 is described below using FIGS. 10(a)–10(f) and 11(a)–11(f).

FIGS. 10(a)–10(f) schematically depict the winding up of the winder 50 and how the first control 20, clutch 30, fixed guide 40, and winder 50 cooperate. Of course, these figures do not show the actual structure. Similarly, FIGS. 11(a)–11 (f) schematically depict the return of the winder 50.

Figure 10A:
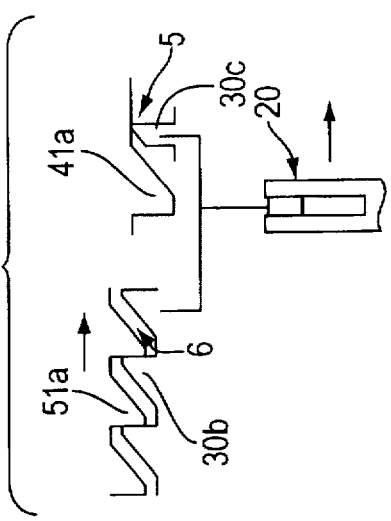
FIGS. 10(a)–10(f) are expanded schematic views depicting the winding operation of the shift control device shown in FIG. 1.

FIG. 10a depicts a state prior to shift control when the first control 20 is in the control starting point (home position). In this state, the inclined face of the cam follower 30c in the cam mechanism 5 is in contact near the apex of the inclined face of the cam 41a. The clutch 30 is stopped in this position despite the energizing force of the first spring 35. At this time, the engagement teeth 51a and the engaging teeth 30b of the engagement mechanism 6 are disengaged. The winder 50 biased in the return direction is held by the fixed base member 70 via the idler 60. The position in which the engagement mechanism 6 is disengaged is referred to as the first position of the clutch 30. FIG. 1 is a partial cross section of the shift control 1 in this state.

Figure 10B:
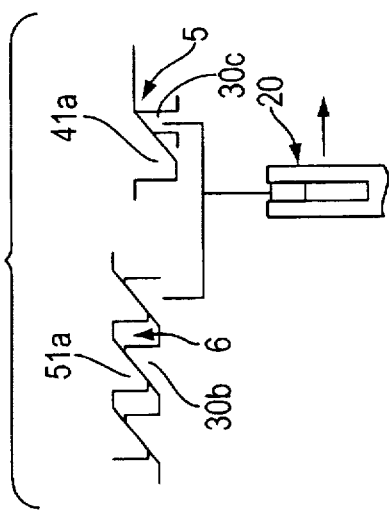

FIG. 10b depicts a state in which the first control 20 is beginning to swing in the wind up direction against the biasing force of a return spring not shown in the figure. As a result of the swing of the first control 20, the cam follower 30c begins to slide along the inclined face of the cam 41a by the biasing force of the first spring 35, thereby approaching the position where the engaging teeth 30b and engagement teeth 51a of the engagement mechanism 6 engage. The clutch 30 slides in the direction of the axis X using the inner spline 26a and outer spline 30a relative to the first control 20.

Figure 10C:
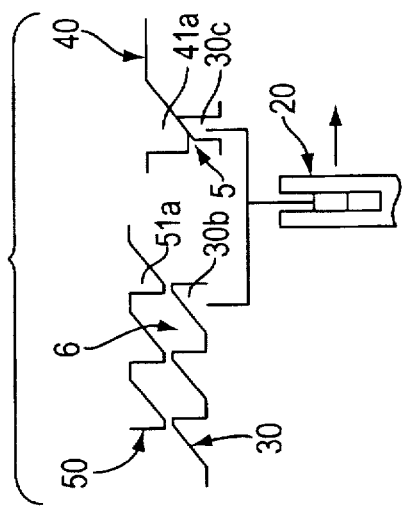

FIG. 10c depicts a state in which the first control 20 is swung further, the clutch 30 is adjacent to the winder 50, and the engaging teeth 30b and engagement teeth 51a of the engagement mechanism 6 are fully engaged. The position in which the engagement mechanism 6 is engaged is referred to as the second position of the clutch 30. Further swing of the first control 20 causes the winder 50 to wind up via the engagement mechanism 6.

Figure 10D:
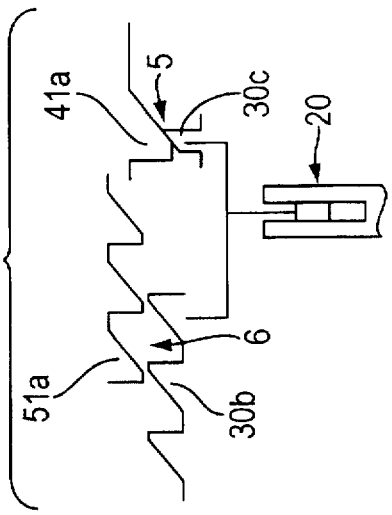
Figure 12:
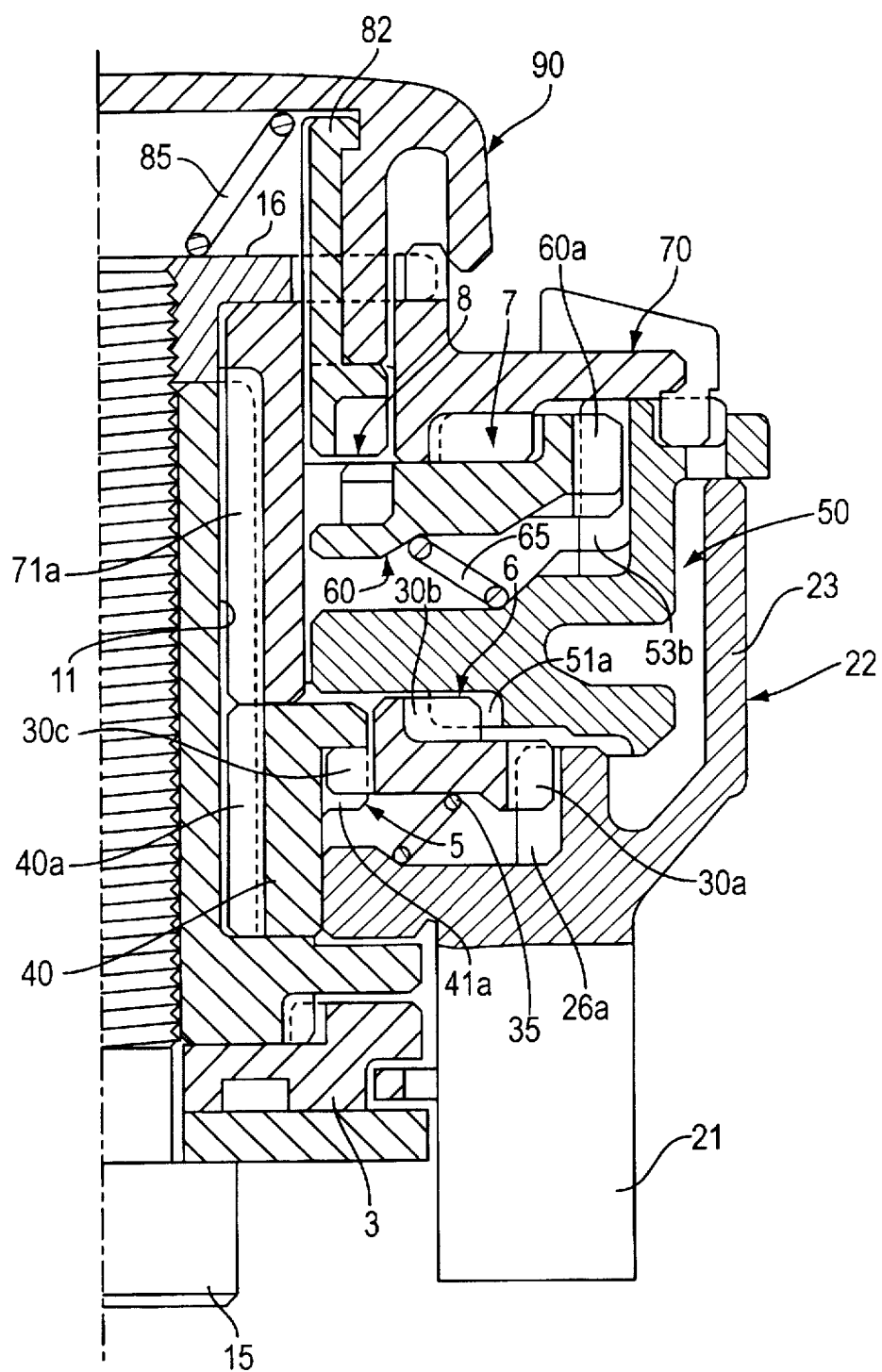
FIG. 12 is a cross sectional view showing the state of the shift control device shown in FIG. 1 during the winding operation.

FIG. 10d depicts a state in which the first control 20 is swung to the control end point. In this state, the winder 50 rotates to the rotating position corresponding to the subsequent shift position. The shift position is thus switched to the subsequent shifting position. FIG. 12 is a partial cross section of the shift control 1 in this state.

Figure 10E:
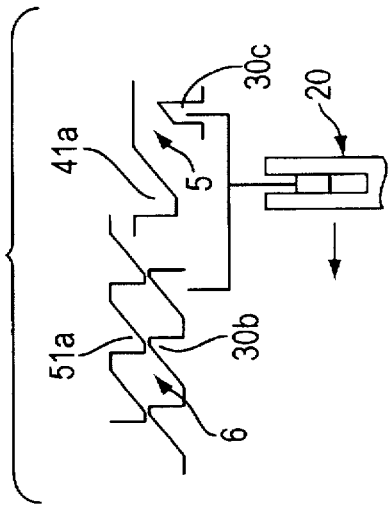

FIG. 10e depicts a state in which the first control 20, after the shift has been completed, has begun to be returned to the home position either manually or by the action of a return spring not shown in the figure. The winder 50, which has rotated to a rotating position corresponding to the subsequent shifting position, is held in that position by the holding engagement mechanism 7 established between the idler 60 and fixed base member 70 because the holding engagement mechanism 7 permits the idler 60, and therefore the winder 50, to rotate in the wind up direction, but prevents it from rotating in the winder 50 return direction. As such, the clutch 30 is disengaged from the winder 50 as the engaging teeth 30b slide along the inclined face of the engagement teeth 51a.

Figure 10F:
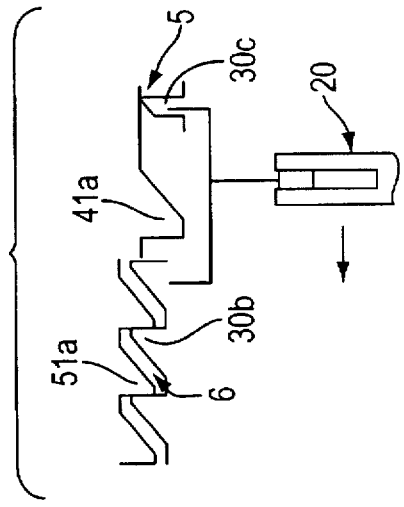

FIG. 10f depicts a state in which the first control 20 has returned to the home position again. In this state, as was the case in FIG. 10a, the inclined face of the cam follower 30c of the cam mechanism 5 is in contact near the apex of the inclined face of the cam 41a, so the clutch 30 returns to the first position, and the engaging teeth 30b and engagement teeth 51a of the engagement mechanism 6 are disengaged.

The return operations using the second control 80 are described next.

Figure 11A:
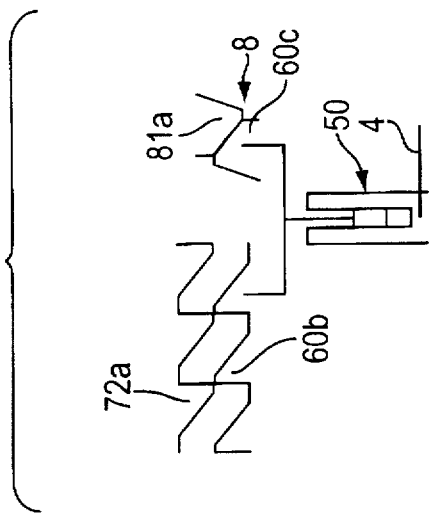
FIGS. 11(a)–11(f) are expanded schematic views depicting the unwinding operation of the shift control device shown in FIG. 1.

FIG. 11a depicts the state prior to shift control when the second control 80 is in the control starting position (home position). In this state, the engaging teeth 60b of the holding engagement mechanism 7 are engaged with the engagement teeth 72a. The idler 60, that is, the winder 50, is held by the fixed base member 70, despite the torque in the return direction by the gear shifting cable 4. To ensure engagement between the engaging teeth 60b and engagement teeth 72a, the idler 60 is energized in the direction of the fixed base member 70 by the second spring 65. The position of the idler when the engaging teeth 60b are engaged with the engagement teeth 72a is referred to as the first position. FIG. 1 is a partial cross section of the shift control 1 in this state.

Figure 11B:
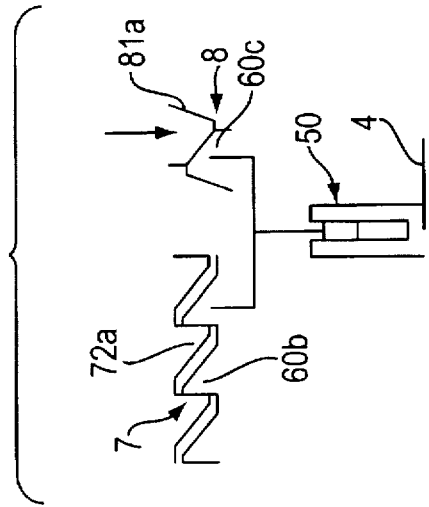

FIG. 11b depicts a state in which the second control 80 is pushed against the biasing force of the third spring 85, the inclined face of the guide 81a on the tip of the second control 80 and the inclined face of the guided part 60c on the idler 60 are in contact, and the second control 80 is moving the idler 60 from the first position to the right direction in the figure. As a result of the movement of the idler 60 to the right, the engaging teeth 60b of the holding engagement mechanism 7 are disengaged from the engagement teeth 72a.

Figure 11C:
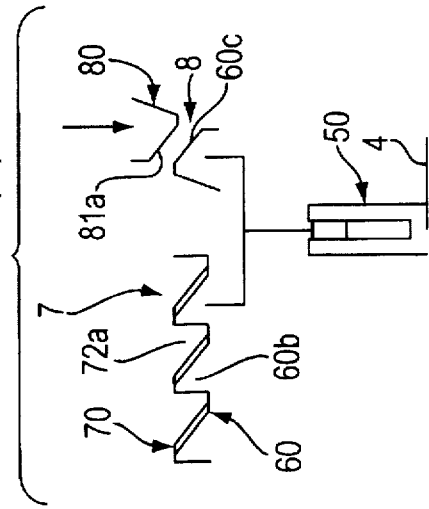
Figure 13:
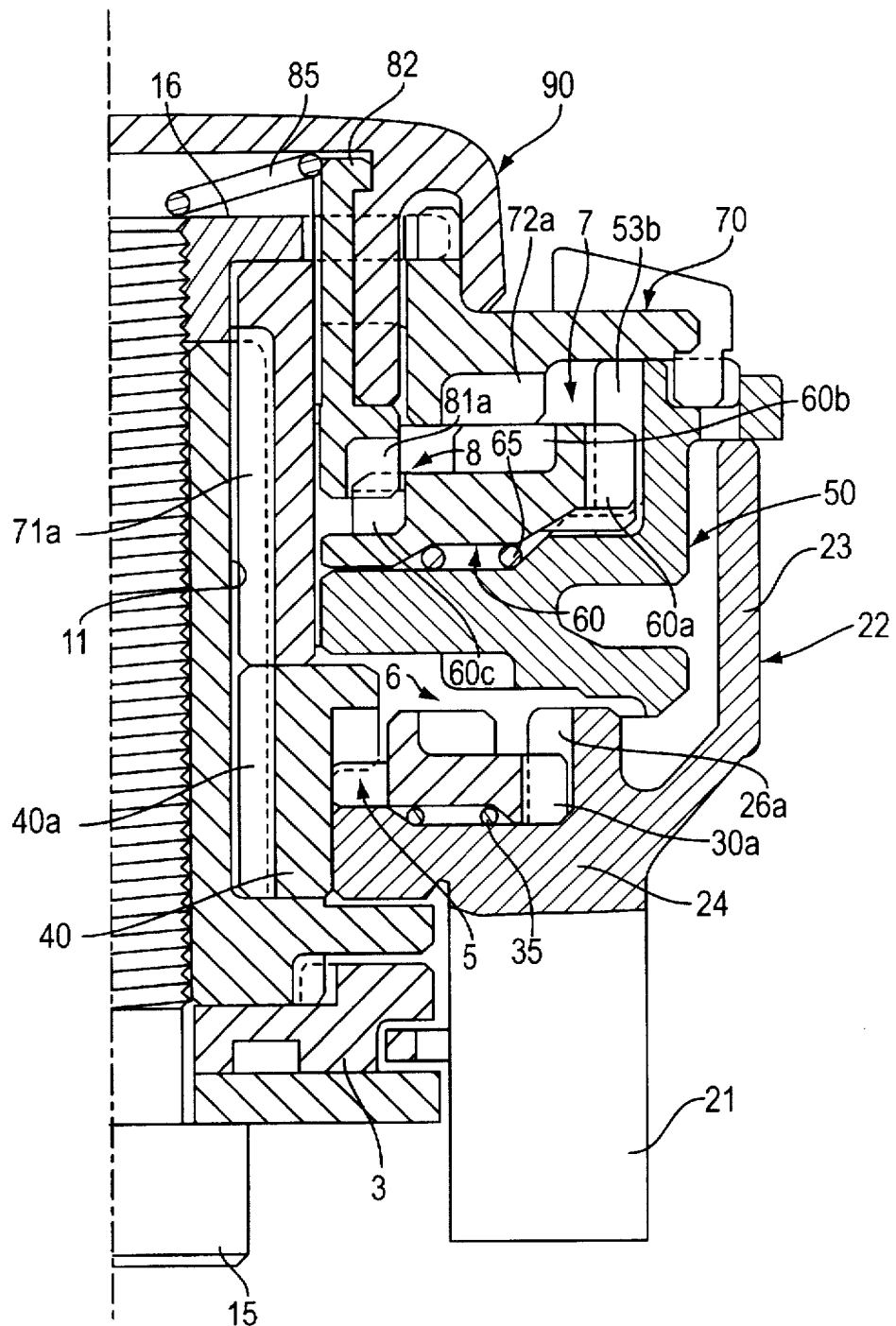
FIG. 13 is a cross sectional view showing the state of the shift control device shown in FIG. 1 during the unwinding operation.

FIG. 11c depicts a state in which the second control 80 is further pushed to the control end point position. As a result, the idler 60 moves to the second position, where the engaging teeth 60b of the holding engagement mechanism 7 are disengaged from the engagement teeth 72a. FIG. 13 is a partial cross section of the shift control 1 in this state.

Figure 11D:
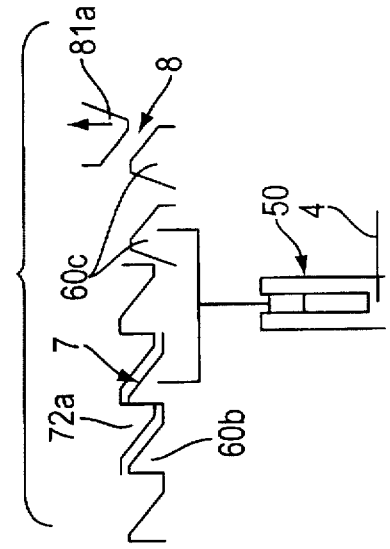

FIG. 11d depicts a state in which the holding engagement mechanism 7 is disengaged, and the idler 60 has begun to rotate in the return direction. When the engaging teeth 60b are disengaged from the engagement teeth 72a, the force attempting to rotate in the return direction and the force from the second spring pushing in the direction of the fixed base member 70 act on the idler 60, and the engaging teeth 60b of the idler 60 move from the incline direction of the inclined face of the guided part 60c on the idler 60 and the inclined face of the guide 81a constituting the inclined guide mechanism 8 so as to be engaged with the subsequent engagement teeth 72a of the fixed base member 70.

Figure 11E:
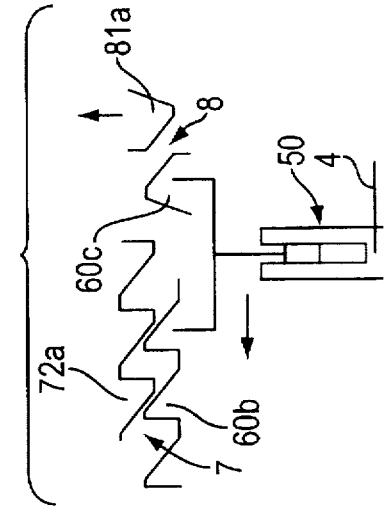

FIG. 11e depicts a state in which the idler 60 is further rotated along with the winder 50 in the return direction. As the idler 60 rotates, it is moved in the direction of the fixed base member 70 by the second spring 65 and returns to the first position. At the same time, the second control 80 is returned by the third spring 85 to the control starting point position.

Figure 11F:
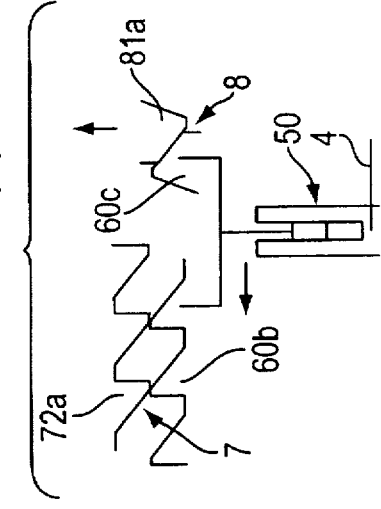

FIG. 11f depicts a state in which the engaging teeth 60b of the idler 60 are stopped by engaging with the subsequent engagement teeth 72a of the fixed base member 70. In this process, the winder 50 rotates integrally with the idler 60 via the inner spline 53b and outer spline 60a, so the gear shifting cable is returned by a series of idler 60 rotating displacements about the length corresponding to one shifting stage. The shifting of the shift control is thus completed.

In the preferred embodiment described above, an inclined protruding shape was adopted as the specific structure for the cam mechanism 5, engagement mechanism 6, holding engagement mechanism 7, and incline guide mechanism 8, but the present invention is not limited to this shape. Mechanical engagement mechanisms or engagement mechanisms based on any of variety of well known geometrical shapes can be adopted.

Figure 14:
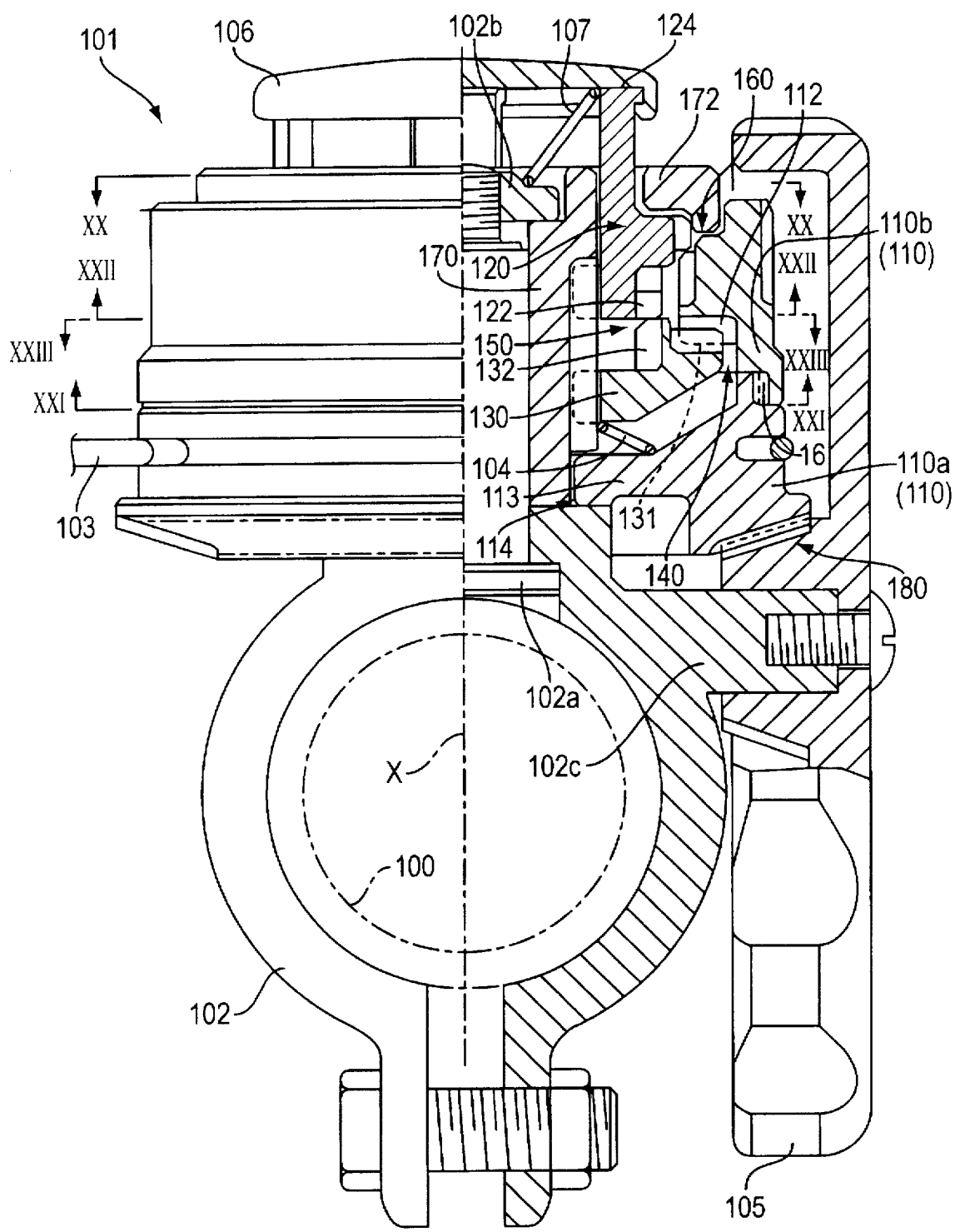
FIG. 14 is a partial cross sectional view of an alternative embodiment of a bicycle shift control device according to the present invention.
Figure 24:
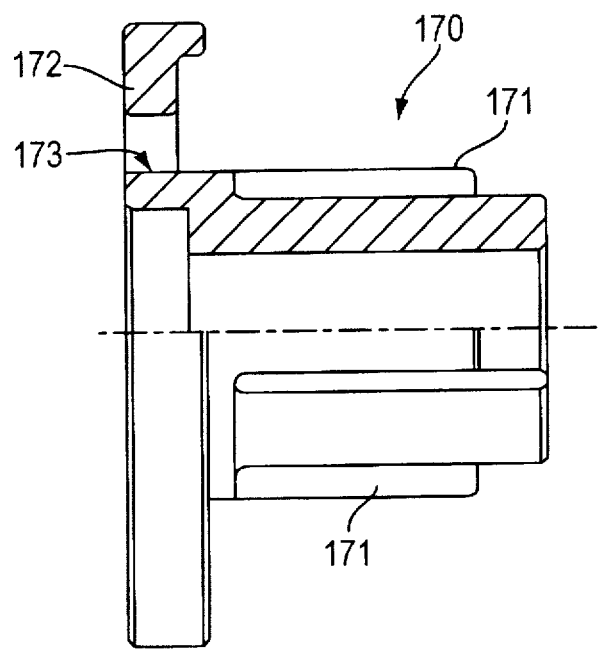
FIG. 24 is a partial cross sectional view of the tube shaft shown in FIG. 14.

FIG. 14 is a partial cross sectional view of an alternative embodiment of a bicycle shift control device according to the present invention. As shown in FIG. 14, a band 102 is used to fasten the shift control 101 to the handlebar 100 of a bicycle, a cross section of which is indicated by the broken line. This shift control 101 basically comprises a winder 110, a slide control 120, an idler 130, and a tube shaft 170. The tube shaft 170 forms a radially stepped hole and is provided to the band 102, has an inner peripheral surface having an axis X such that it is fitted around a shaft 102a, and is fixed by a fastening nut 102b. The slide control 120, the idler 130, and the winder 110 are concentrically fitted onto the outer peripheral surface of this tube shaft 70. As shown in FIG. 24, a flange 172 that extends radially outward is provided to one end of the tube shaft 170, and in this flange 172 are formed through holes 173. Extensions 124 that extend in the axial direction of the slide control 120, and which are distributed at a pitch of 90 degrees in the peripheral direction, pass through holes 173.

In this embodiment, the slide control 120 and the tube shaft 170 are linked by the engagement of an inner spline component 123 (FIG. 22) provided to the slide control 120 and an outer spline component 171 (FIG. 23) provided to the tube shaft 170 so that the slide control 120 and the tube shaft 170 can be displaced relative to each other in the axial direction but not in the rotational direction. On the other hand, as can be understood from FIG. 23, the idler 130 and the tube shaft 170 are linked by the engagement of an inner spline component 133 provided to the idler 130 and the outer spline component 171 provided to the tube shaft 170 with a rotational play of about five degrees. Thus, the idler 130 is able to be displaced in the axial direction, and rotation of the idler 130 of about 5 degrees is permitted around the axis X with respect to the tube shaft 170.

The winder 110 is provided with a bottom wall 113 that extends radially inward at the end away from the slide control 120, and this bottom wall 113 is provided with a center through hole 114 into which the tube shaft 170 is inserted. For assembly reasons, winder 110 is split in two, comprising a first member 110a including the bottom wall 113 and the connection with the control cable 103, and a second member 110b that forms the inner spline component 111 (FIG. 20) of an engagement means 140. A spline 116 is provided for the connection of the first member 110a and the second member 110b. As a result, this shift control can be easily assembled by inserting the first member 110a and the second member 110b of the winder 110, the slide control 120, and the idler 130, in that order, in the axial direction with respect to the tube shaft 170 that serves as the base.

The winder 110 is able to rotate around the outer peripheral surface of the tube shaft 170, that is, around the axis X.

The winder 110 is linked by a control cable 103 to a derailleur (not shown here), and when the winder 110 is rotated in the winding direction of the control cable 103, the control cable 103 is pulled and the derailleur is moved in the upshift direction, for example. Conversely, when the winder 110 is rotated in the rewind direction of the control cable 103, the control cable 103 is slackened, and the action of a return spring or the like causes the derailleur to move in the downshift direction, for example. The rotation of the winder 110 in the winding direction is accomplished by rotating a disk-shaped dial 105 rotatably supported by a pin 102c projecting at a right angle with respect to the shaft 102a from the side of the band 102. A bevel gear mechanism 180 is provided between the dial 5 and the winder 110 for communicating rotation of dial 105 to winder 110.

Figure 21:
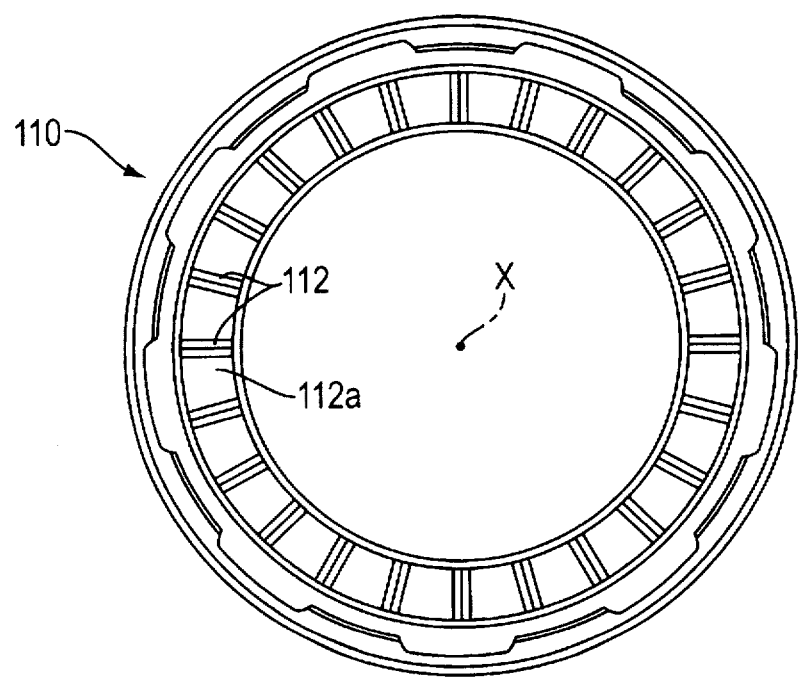
FIG. 21 is a view taken along line XXI—XXI in FIG. 14.
Figure 23:
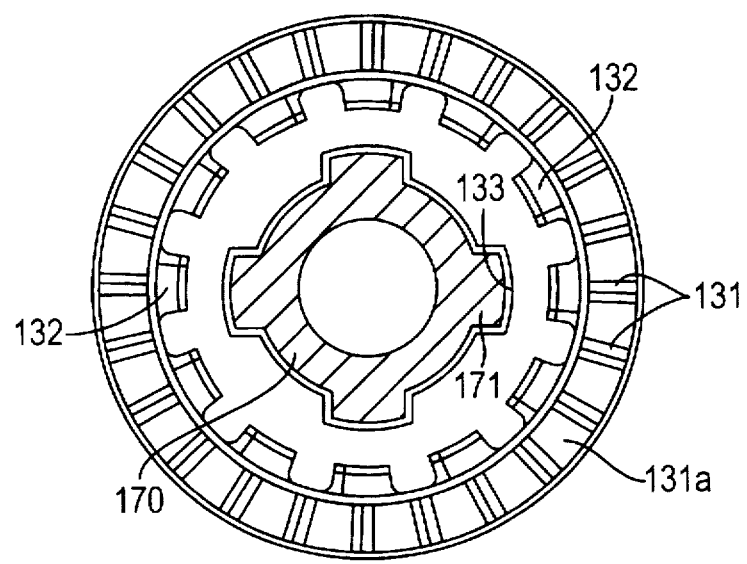
FIG. 23 is a view taken along line XXIII—XXIII in FIG. 14.

The fixing of the winder 110 with respect to the tube shaft 170 in the desired shift position is accomplished via the idler 130, and to this end an engagement means 140 is provided between the winder 110 and the idler 130. The engagement means 140 comprises 24 engaging teeth 112 formed circumferentially around winder 110, as shown in FIG. 21, and 24 engaged teeth 131 formed circumferentially around idler 130, as shown in FIG. 23. As can be readily understood from a combination of FIGS. 15(b), 21 and 23, these engaging and engaged teeth form inclined faces 112a and 131a such that rotational displacement provided by manual operation of the winder 110 in the gear shift cable winding direction results in downward displacement of the idler 130. In other words, when the winder 110 is rotated in the winding direction, the rotational force thereof is transmitted from the inclined face 112a of the engaging teeth 112 to the inclined face 131a of the engaged teeth of the idler 130, and the idler 130 is pushed downward. If the idler 130 is biased upwardly, preferably by a ring spring 104, then the rotation of the winder 110 in the winding direction will be accompanied by clicks at each 15-degree unit. On the other hand, rotation of winder 110 in the opposite direction is prevented by the vertical faces of engaging teeth 112 and engaged teeth 131.

The rotation of the winder 110 in the rewind direction will be described in detail below, but it is accomplished by pressing the slide control 120 down by pressing a cap 106 mounted to the tip thereof. Here, the displacement of the slide control 120 in the axial direction is converted via the idler 130 into rotational displacement and transmitted to the winder 110. To this end, a cam means 150 is provided between the slide control 120 and the idler 130.

Figure 15A:
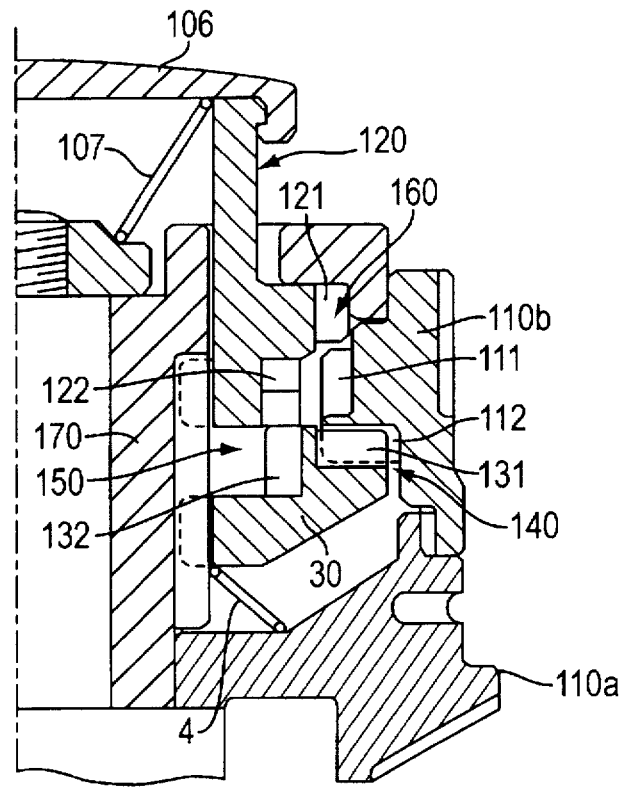
Figure 15B:
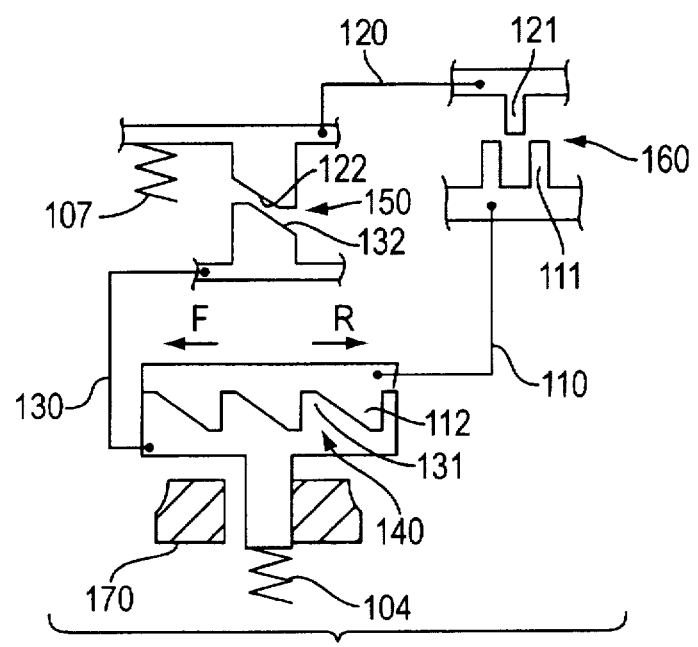
Figure 22:
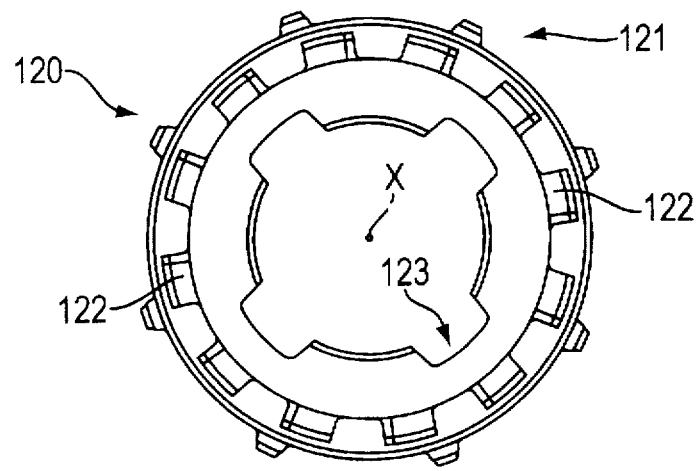
FIG. 22 is a view taken along line XXII—XXII in FIG. 14.

As can be readily understood from a combination of FIGS. 15(b), 22 and 23, the cam means 150 comprises inclined cam faces 122 (12 of them here) formed circumferentially around the end of the slide control 120 on the idler 130 side and inclined cam follower faces 132 (12 of them here) formed circumferentially around the idler 130 on the slide control 120 side. The shape of these two sets of inclined faces is set such that when the slide control 120 is pressed downwardly, the contact between the inclined cam faces 122 with the cam follower faces 132 causes the idler 130 to rotate in the direction F shown in FIG. 15(b) as the idler 130 moves downwardly along the axis X. This rotation of the idler 130 results in the engaging teeth 112 of the winder 110 coming to a position corresponding to the region of the next engaged teeth 131 of the idler 130. If the slide control 120 is then returned upwardly, the winder 110 will rotate in the rewind direction until the engaging teeth 112 and the next engaged teeth 131 become engaged. In order to permit the specific rotation of the above-mentioned idler 130, each indentation in the inside spline component 171 formed around the inside of the idler 130 is provided with rotational play of about five degrees in the peripheral direction with respect to the width of one tooth of the spline component 171 provided around the outside of the tube shaft 170.

Figure 20:
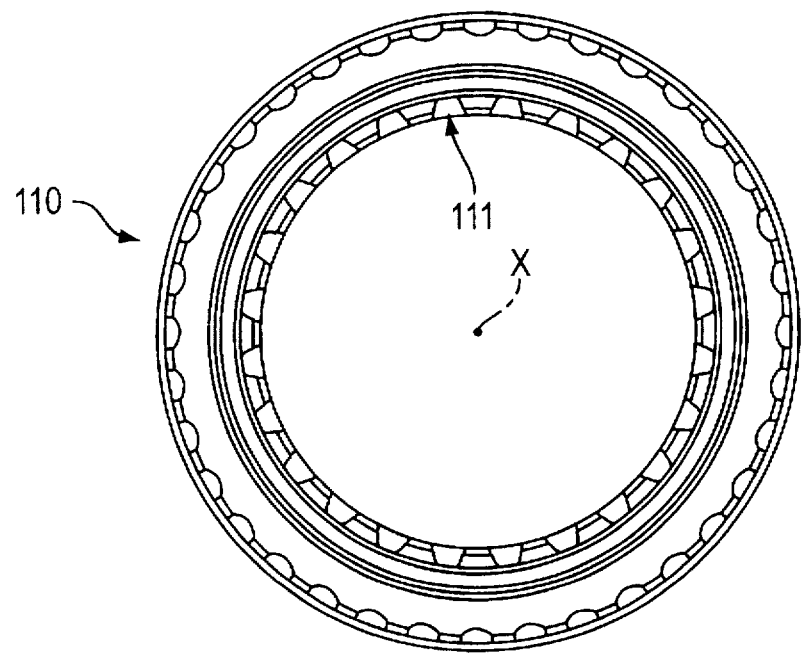
FIG. 20 is a view taken along line XX—XX in FIG. 14.

A winder support means 160 that temporarily holds the winder 110 is provided between the slide control 120 and the winder 110 prevents the winder 110 from rotating all at once to its final position as a result of the action of the return spring or the like during a shift. This winder support means 160, as shown in FIGS. 20 and 22, can comprise an inner spline component 111 formed around the inner surface of the winder 110 and an outer spline component 121 formed around the outer surface of the slide control 120. With the slide control 120 configuration shown in FIG. 22, this outer spline component 121 is equipped with eight teeth, distributed at a pitch of 45 degrees in the peripheral direction. With the winder 110 configuration shown in FIG. 20, the inner spline component 111 is provided with 24 teeth or indentations, distributed at a pitch of 15 degrees in the peripheral direction. The slide control 120 is provided with an inner spline component 123 that engages with a spline component 171 (FIG. 24) provided around the outside of the tube shaft 170 so that movement is possible in the axial direction, but rotation is impossible around the tube shaft 170. Furthermore, the rotation of the winder 110 around the tube shaft 170 is limited so that the action of the idler 130 will result in a specific pitch, for example, 15-degree units. Therefore, the inner spline component 111 of the winder 110 and the outer spline component 121 of the slide control 120 are positioned such that they will constantly be engaged as the slide control 120 moves in the axial direction toward the inner spline component 111 of the winder 110 in order to disengage the winder 110 and the idler 130.

In this embodiment of the present invention, the inner spline component 123 that engages with the spline component 171 of the tube shaft 170 and the inclined cam faces 122 that serve as the cam means 150 formed in the slide control 120 are positioned in roughly the same plane perpendicular to the axis X, while the inclined cam follower faces 132 formed for the cam means 150 and the engaged teeth 131 that serve as the engagement means 140 formed in the idler 130 are positioned in roughly the same plane perpendicular to the axis X, and this contributes to making the size of the slide control 120 and the idler 130 smaller in the axial direction. Furthermore, when the inner spline component 111 that serves as the winder support means 160 or the engaging teeth 112 that serve as the engagement means 140 is also provided to the inner peripheral side of the cylindrically formed winder 110, then, as is clear from FIG. 14, the entire idler 130 and at least part of the slide control 120 can be housed in the annular space formed by the winder 110 and the tube shaft 170 that serves as the common support shaft for the winder 110, the slide control 120, and the idler 130.

As shown in FIG. 14, the engagement means 140, cam means 150, and winder support means 160 are positioned within an essentially enclosed annular space produced by the attachment structure of the winder 110, which is equipped with a bottom wall 113 that extends inward in the diameter direction, and the tube shaft 170, which is equipped with a flange 172 that extends radially outward. This results in a structure that is favorable in terms of keeping dust out of the unit.

The action during shifting resulting from the slide control 120 of this shift control 101 will now be described with reference to FIGS. 15–19. In each of FIGS. 15–19, (a) is a cross section of the state in the various action stages of the winder 110, the slide control 120, and the idler 130, and (b) is an expanded schematic of the state in the various action stages of the engagement means 140, the cam means 150, and the winder support means 160.

FIGS. 15(a) and 15(b) show the stage prior to shifting, in which the winder 110 is positioned by the idler 130 in a specific position against the rotational force in the direction of the arrow R by means of a return spring or the like via the engagement means 140. The slide control 120 is positioned at its start position by the energizing force of the spring 107.

Figure 16A:
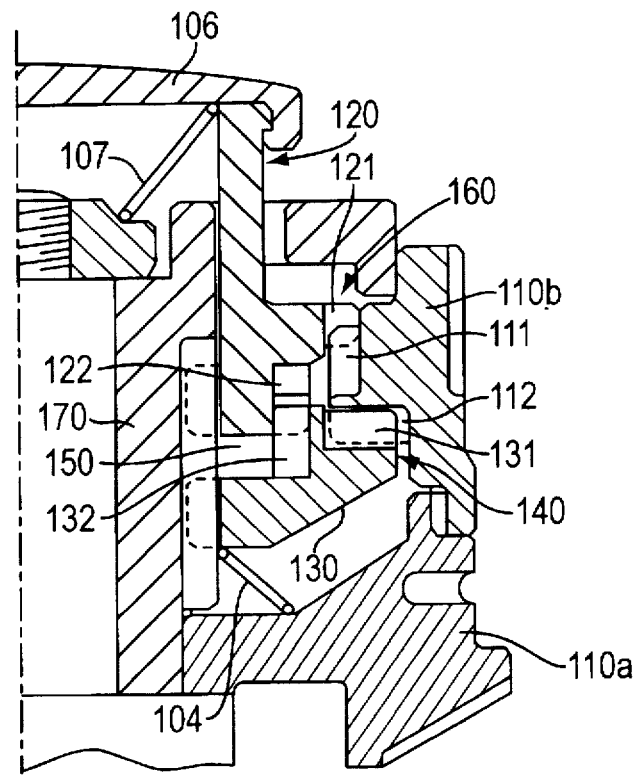
Figure 16B:
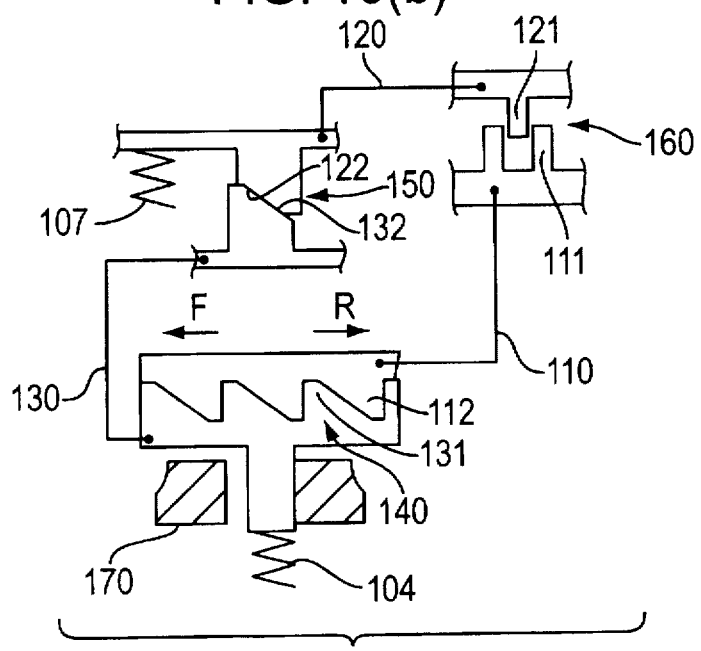

FIGS. 16(a) and 16(b) show the stage in which the cap 106 is pressed and the slide control 120 is moved downwardly in the axial direction, the inner spline component 111 and the outer spline component 121 of the winder support means 160 begin to engage, and the inclined cam faces 122a and the inclined cam follower faces 132a of the cam means 150 come into contact.

Figure 17A:
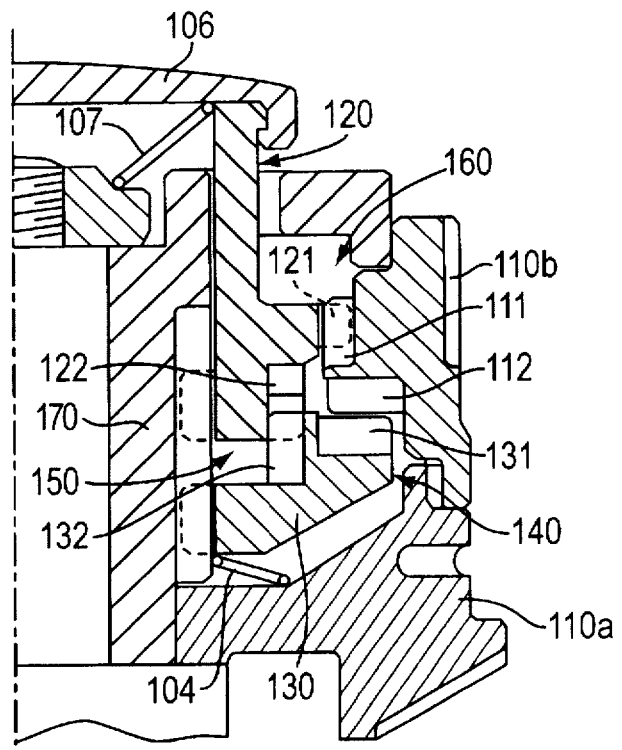
Figure 17B:
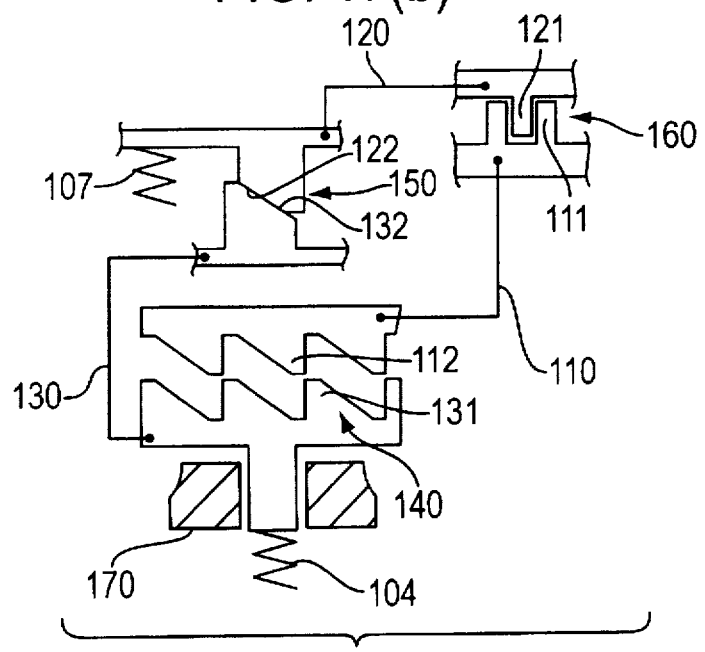

FIGS. 17(a) and 17(b) show the stage in which the cap 106 is pressed further and the slide control 120 is thereby moved further in the axial direction, during which the idler 130 is moved downwardly against the energizing force of the spring 104 in the axial direction to its end position in a state of contact between the inclined cam faces 122 and the inclined cam follower faces 132, and the engaging teeth 112 and engaged teeth 131 of the engagement means 140 are disengaged. In this stage, despite the fact that the engaging teeth 112 and engaged teeth 131 of the engagement means 140 are disengaged, the winder 110 is temporarily held by the slide control 120 via the engagement between the inner spline component 111 and the outer spline component 121 of the winder support means 160.

Figure 18A:
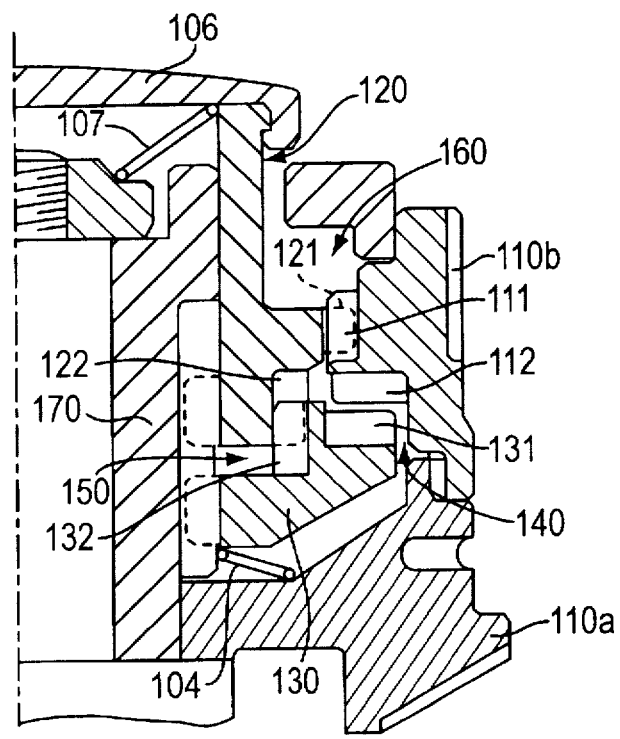
Figure 18B:
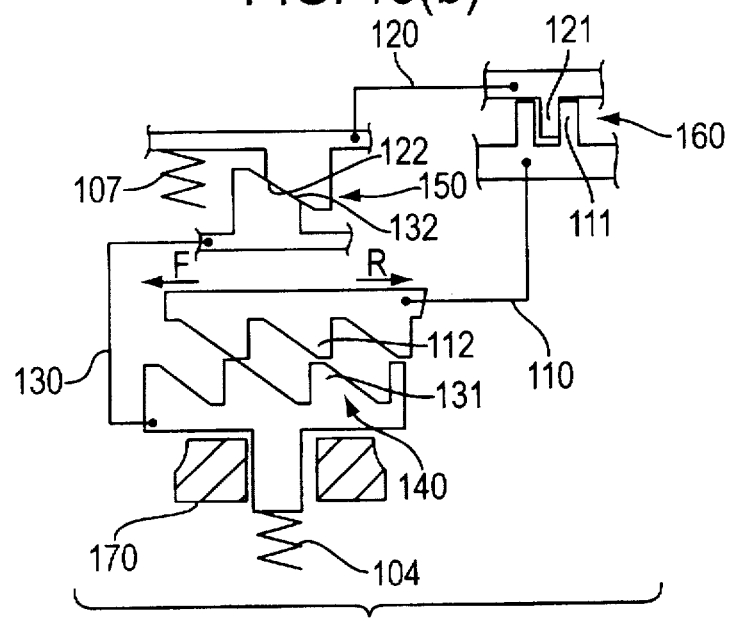

FIGS. 18(a) and 18(b) show the stage in which the cap 106 is pressed further and part of the axial direction displacement thereby transmitted to the slide control 120 is converted into rotational force in the direction of the arrow F around the axis X of the idler 130 by means of the inclined cam faces 122 and the inclined cam follower faces 132 of the cam means 150. This results in the idler 130 rotating in the direction of the arrow F which, in turn, results in the engaging teeth 112 and the engaged teeth 131 of the engagement means 140 undergoing mutual displacement in the region of the next tooth.

Figure 19A:
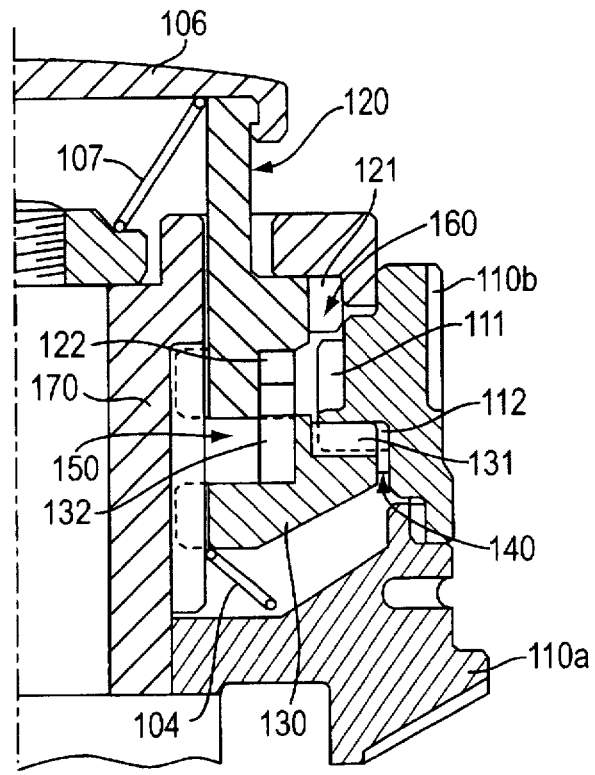
Figure 19B:
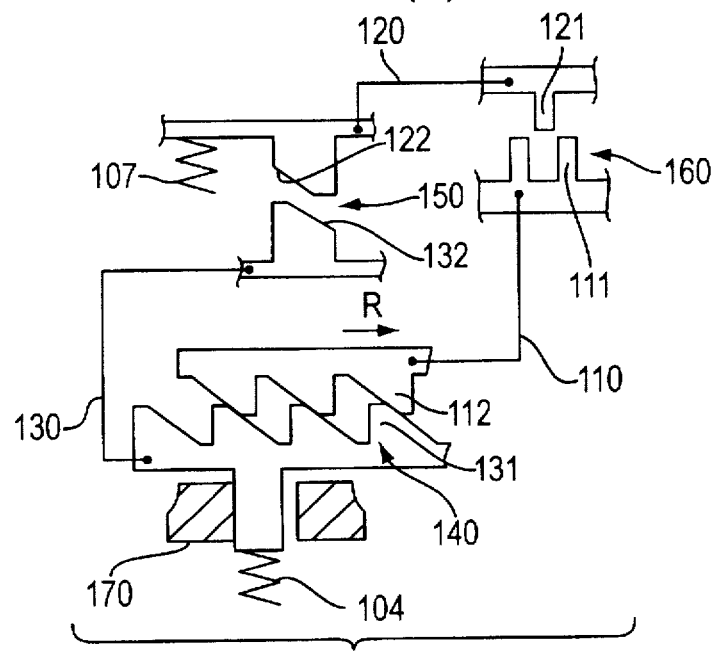

FIGS. 19(a) and 19(b) show the stage in which the slide control 120 is moved upwardly to the start position by releasing the pressure on the cap 106. The inner spline component 111 and outer spline component 121 of the winder support means 160 disengage and, at the same time, the idler 130 moves upwardly in the axial direction toward the slide control 120. The disengagement of the winder support means 160 that occurs in this stage results in the rotation of the winder 110 in the direction of the arrow R, and the engaged teeth 131 become engaged with the engaging teeth 112 as a result of the movement of the idler 130 to the left in the axial direction. Ultimately, this results in the winder 110 completing a shift, such as a downshift, of one gear in the direction of the arrow R.

A shift in the opposite direction, such as an upshift, is accomplished by rotating the dial 105 and thereby rotating the winder 110 in the direction of the arrow F, during which the idler 130 moves downwardly against the energizing force of the spring 104 in the axial direction, that is, in the direction of disengagement of the engagement means 140. To this end, the engaging teeth 112 and the engaged teeth 132 of the engagement means 140 are formed in a shape in which inclined faces and vertical faces repeat alternately, so as to provide displacement in the axial direction in which the rotation of the winder 110 in the direction of the arrow F disengages the idler 130. As a result, the rotation of the winder 110 occurs in steps, one tooth at a time, as in a ratcheting mechanism.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle shift control device for controlling a gear shifter via a gear shift cable comprising:

a winding member (50,110) supported for rotation around an axis (X) for winding the gear shift cable;

a first control member (20,105) for rotating the winding member (50,110) in a first direction;

a second control member (80,120) mounted concentrically with the axis (X) for causing rotation of the winding member (50,110) in a second direction opposite the first direction in response to movement of the second control member (80,120) in the direction of the axis (X);

wherein at least one of the first control member (20) and the second control member (80,120) is movable between a control member start position and a control member end position; and a winding member controller member (30,60,130) for controlling the rotation of the winding member (50, 110), wherein the winding member controller member (30,60,130) is adapted to rotate about the axis (X) and to move in the direction of the axis (X) from a first position when the at least one of the first control member (20) and the second control member (80,120) is located in the control member start position to a second position as the at least one of the first control member (20) and the second control member (80,120) moves toward the control member end position.

2. The device according to claim 1 wherein the first control member (20) is mounted for rotation around the axis (X).

3. A bicycle shift control device for controlling a gear shifter via a gear shift cable comprising:

a winding member (50,110) supported for rotation around an axis (X) for winding the gear shift cable;

a first control member (20,105) for rotating the winding member (50,110) in a first direction; and a second control member (80,120) mounted concentrically with the axis (X) for causing rotation of the winding member (50,110) in a second direction opposite the first direction in response to movement of the second control member (80,120) in the direction of the axis (X);

wherein the first control member (20) comprises:
a boss (22) that rotates about the axis (X); and
an elongated lever (21) which extends from the boss (22) in the direction of the axis (X).

4. The device according to claim 3 wherein the first control member (20) forms a bottom face of the shift control device, and wherein the second control member (80) forms a top face of the shift control device.

5. The device according to claim 3 wherein the boss (22) has a cylindrical shape.

6. The device according to claim 3 wherein the first control member (20) further comprises a finger contact member (21a) extending from an end of the lever (21) substantially perpendicular to the axis (X).

7. The device according to claim 3 wherein an outer peripheral wall of the boss (22) forms a sidewall of the shift control device.

8. The device according to claim 7 wherein the winding member (50) is disposed within an area defined by the outer peripheral wall of the boss (22).

9. The device according to claim 3 further comprising:
a handlebar (100);
a fastening band (2) for fastening the first control member (20) and the second control member (80) to the handlebar (100) so that the first control member (20) is disposed below the handlebar (100) and the second control member (80) is disposed above the handlebar (100).

10. The device according to claim 3 further comprising:
first biasing means for biasing the first control member (20) to a first position; and
second biasing means (85) for biasing the second control member (80) to a second position.

11. A bicycle shift control device for controlling a gear shifter via a gear shift cable comprising:

a winding member (50,110) supported for rotation around an axis (X) for winding the gear shift cable;

a first control member (20,105) for rotating the winding member (50,110) in a first direction; and a second control member (80,120) mounted concentrically with the axis (X) for causing rotation of the winding member (50,110) in a second direction opposite the first direction in response to movement of the second control member (80,120) in the direction of the axis (X);

wherein the first control member (20) rotates between a first control member start position and a first control member end position, and further comprising a clutch member (30) which rotates integrally with the first control member (20), wherein the clutch member (30) moves in the direction of the axis (X) from a first clutch position when the first control member (20) is located in the first control member start position to a second clutch position as the first control member (20) rotates toward the first control member end position, wherein the clutch member (30) is disengaged from the winding member (50) when the clutch member (30) is located in the first clutch position, and wherein the clutch member (30) is engaged with the winding member (50) when the clutch member (30) is located in the second clutch position.

12. The device according to claim 11 further comprising a cam mechanism (5) for causing the clutch member (30) to engage the winding member (50) as the first control member (20) moves toward the first control member end position so that rotation of the first control member (20) causes rotation of the winding member (50).

13. The device according to claim 12 wherein the cam mechanism (5) comprises:
a cam (41a) disposed on a fixed guide (40); and
a cam follower (30c) disposed on the clutch member (30) for contacting the cam (41a) so that rotation of the clutch member (30) causes the cam follower (30c) to slide relative to the cam (41a) so that the clutch member (30) moves from the first clutch position to the second clutch position.

14. The device according to claim 13 wherein the clutch member (30) includes a plurality of clutch member splines (30a), and wherein the first control member (20) includes a plurality of first control member splines (26a) which engage the clutch member splines (30a) so that the clutch member (30) rotates integrally with the first control member (20).

15. The device according to claim 14 wherein the clutch member (30) has a ring shape, wherein the cam follower (30c) comprises a plurality of cam follower teeth disposed on an inner peripheral surface of the clutch member (30), wherein the plurality of clutch member splines (30a) are disposed on an outer peripheral surface of the clutch member (30), wherein the clutch member (30) includes a plurality of engaging teeth (30b) formed in a circumferential direction thereof, and wherein the winding member (50) includes a plurality of engagement teeth (51a) formed in a circumferential direction thereof for engaging with the plurality of engaging teeth (30b) when the clutch member (30) is located in the second clutch position 16. The device according to claim 15 wherein the fixed guide (40) has a cylindrical shape, wherein the cam (41a) comprises a plurality of cam teeth disposed on an outer peripheral surface of the fixed guide (40), wherein the first control member (20) includes an annular boss (22), wherein the boss (22), the clutch member (30), the fixed guide (40) and the winder (50) are concentrically arranged, wherein the boss (22), the fixed guide (40) and the winder (50) define an annular space, and wherein the clutch member (30) is disposed in the annular space.

17. The device according to claim 16 further comprising a clutch spring (35) for biasing the clutch member (30) to the second clutch position.

18. The device according to claim 11 further comprising a one-way transmission mechanism (7) which allows the winding member (50) to rotate with the first control member (20) as the first control member (20) rotates from the first control member start position toward the first control member end position and which prevents the winding member (50) from rotating with the first control member (20) as the first control member (20) rotates from the first control member end position toward the first control member start position.

19. The device according to claim 18 wherein the one-way transmission mechanism (7) comprises:

an idler member (60) which rotates integrally with the winding member (50), wherein the idler member (60) includes a plurality of engaging teeth (60b);

a fixed member (72) which does not rotate with the winding member (50), wherein the fixed member (72) includes a plurality of engagement teeth (72a);

wherein at least one of the plurality of engaging teeth (60b) or the plurality of engagement teeth (72a) each define an inclined surface which allows the idler member (60) to move relative to the fixed member (72) as the first control member (20) moves from the first control member start position toward the first control member end position.

20. A bicycle shift control device for controlling a gear shifter via a gear shift cable comprising:

a winding member (50,110) supported for rotation around an axis (X) for winding the gear shift cable;

a first control member (20,105) for rotating the winding member (50,110) in a first direction; and a second control member (80,120) mounted concentrically with the axis (X) for causing rotation of the winding member (50,110) in a second direction opposite the first direction in response to movement of the second control member (80,120) in the direction of the axis (X);

wherein the second control member (80) moves linearly between a second control member start position and a second control member end position, and further comprising:

a fixed member (72) which does not rotate with the winding member (50);

an idler member (60) which rotates integrally with the winding member (50), wherein the idler member (60) moves in the direction of the axis (X) from a first idler position when the second control member (80) is located in the second control member start position to a second idler position as the second control member (80) moves toward the second control member end position, wherein the idler member (60) is engaged with the fixed member (72) when the idler member (60) is located in the first idler position, and wherein the idler member (60) is disengaged from the fixed member (72) when the idler member (60) is located in the second idler position.

21. The device according to claim 20 further comprising an inclined guide mechanism (8) for allowing movement of the idler member (60) toward the first idler position as the second control member (80) moves toward the second control member end position.

22. The device according to claim 21 wherein the inclined guide mechanism comprises:

an inclined guide (81a) disposed on the second control member (80);

an inclined guided part (60c) disposed on the idler member (60); and wherein the inclined guide (81a) presses against the inclined guided part (60c) when the second control member (80) moves from the second control member start position toward the second control member end position to cause the idler member (60) to move from the first idler position toward the second idler position.

23. The device according to claim 22 further comprising an idler spring (65) for biasing the idler (60) toward the fixed member (70).

24. The device according to claim 23 wherein the fixed member (72) and the winder (50) are concentrically arranged, wherein the winder (50) defines an annular space with the fixed member (72), and wherein the idler member (60) is disposed within the annular space.

25. A bicycle shift control device for controlling a gear shifter via a gear shift cable comprising:

a winding member (50,110) supported for rotation around an axis (X) for winding the gear shift cable;

a first control member (20,105) for rotating the winding member (50,110) in a first direction; and a second control member (80,120) mounted concentrically with the axis (X) for causing rotation of the winding member (50,110) in a second direction opposite the first direction in response to movement of the second control member (80,120) in the direction of the axis (X);

wherein the second control member (120) moves linearly between a second control member start position and a second control member end position, and further comprising:

an idler member (130) coupled to the second control member (120) and structured to move in the direction of the axis (X) from a first idler position when the second control member (120) is located in the second control member start position to a second idler position as the second control member (120) moves toward the second control member end position, wherein the idler member (130) is structured to rotate around the axis (X); and an engagement mechanism (140) which engages the idler member (130) with the winding member (110) when the idler member (130) is located in the first idler position and which disengages the idler member (130) from the winding member (110) when the idler member (130) is located in the second idler position.

26. The device according to claim 25 wherein the engagement mechanism (140) comprises:

a plurality of engaging teeth (112) disposed on the winding member (110); and a plurality of engagement teeth (131) disposed on the idler member (130).

27. The device according to claim 26 wherein at least one of the plurality of engaging teeth (112) or the plurality of engagement teeth (131) each define an inclined surface which causes the idler member (130) to move in the direction of the axis (X) as the winding member (110) moves in a cable winding direction.

28. The device according to claim 25 further comprising a cam mechanism (150) for causing the idler member (130) to rotate around the axis (X) as the idler member (130) moves from the first idler position to the second idler position.

29. The device according to claim 28 wherein the cam mechanism (150) comprises:

a plurality of cam faces (122) formed in a circumferential direction about the second control member (120);

a plurality of cam follower faces (132) formed in a circumferential direction about the idler member (130);

wherein the plurality of cam faces (122) contact the plurality of cam follower faces (132) as the second control member (120) moves from the second control member start position toward the second control member end position; and wherein at least one of the plurality of cam faces (122) or the plurality of cam follower faces (132) each define an inclined surface which causes the idler member (130) to move around the axis (X) as the second control member (120) moves from the second control member start position toward the second control member end position.

30. The device according to claim 25 further comprising winding member support means (160) for preventing rotation of the winding member (110) when the idler member (130) is disengaged from the winding member (110).

31. The device according to claim 30 wherein the winding member support means (160) comprises:

a plurality of winding member splines (111) disposed on the winding member; and a plurality of second control member splines (121) disposed on the second control member (120).

32. The device according to claim 25 wherein the winding member (110), the second control member (120), and the idler member (130) are mounted concentrically about the axis (X).

33. The device according to claim 32 wherein the winding member (110), the second control member (120), and the idler member (130) each have an annular shape.

34. The device according to claim 33 wherein the winding member (110), the second control member (120), and the idler member (130) are commonly supported by a tube shaft (170).

35. The device according to claim 25 further comprising an idler spring (104) for biasing the idler member (130) toward the first idler position.

36. The device according to claim 25 wherein the first control member (105) comprises a dial.

37. A bicycle shift control device for controlling a gear shifter via a gear shift cable comprising:

a winding member (50) supported for rotation around an axis (X) for winding the gear shift cable;

a control member (20) for causing rotation of the winding member (50) in one direction;

wherein the control member (20) rotates between a control member start position and a control member end position; and a clutch member (30) which rotates integrally with the control member (20), wherein the clutch member (30) moves in the direction of the axis (X) from a first clutch position when the control member (20) is located in the control member start position to a second clutch position as the control member (20) rotates toward the control member end position, wherein the clutch member (30) is disengaged from the winding member (50) when the clutch member (30) is located in the first clutch position, and wherein the clutch member (30) is engaged with the winding member (50) when the clutch member (30) is located in the second clutch position.

38. A bicycle shift control device for controlling a gear shifter via a gear shift cable comprising:

a winding member (50) supported for rotation around an axis (X) for winding the gear shift cable;

a control member (80) for causing rotation of the winding member (50) in one direction;

wherein the control member (80) moves in the direction of the axis (X) between a control member start position and a control member end position;

a fixed member (72) which does not rotate with the winding member (50);

an idler member (60) which rotates integrally with the winding member (50), wherein the idler member (60) moves in the direction of the axis (X) from a first idler position when the control member (80) is located in the control member start position to a second idler position as the control member (80) moves toward the control member end position, wherein the idler member (60) is engaged with the fixed member (72) when the idler member (60) is located in the first idler position, and wherein the idler member (60) is disengaged from the fixed member (72) when the idler member (60) is located in the second idler position.

39. A bicycle shift control device for controlling a gear shifter via a gear shift cable comprising:

a winding member (110) supported for rotation around an axis (X) for winding the gear shift cable;

a control member (120) for causing rotation of the winding member (110) in one direction;

wherein the control member (120) moves in the direction of the axis (X) between a control member start position and a control member end position;

an idler member (130) coupled to the control member (120) and structured to move in the direction of the axis (X) from a first idler position when the control member (120) is located in the control member start position to a second idler position as the control member (120) moves toward the control member end position, wherein the idler member (130) is structured to rotate around the axis (X); and an engagement mechanism (140) which engages the idler member (130) with the winding member (110) when the idler member (130) is located in the first idler position and which disengages the idler member (130) from the winding member (110) when the idler member (130) is located in the second idler position.

40. The device according to claim 39 further comprising a cam mechanism (150) for causing the idler member (130) to rotate around the axis (X) as the idler member (130) moves from the first idler position to the second idler position.

* * * * *